(12) United States Patent
Tobinaga et al.

(10) Patent No.: US 8,982,256 B2
(45) Date of Patent: Mar. 17, 2015

(54) IMAGING DEVICE

(71) Applicant: Panasonic Corporation, Kadoma-shi, Osaka (JP)

(72) Inventors: Masato Tobinaga, Hyogo (JP); Hirotsugu Fusayasu, Kyoto (JP); Masafumi Kumoi, Osaka (JP); Ryuichi Nagaoka, Osaka (JP); Yoshio Nishizawa, Osaka (JP); Atsushi Inoue, Tokushima (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 104 days.

(21) Appl. No.: 13/723,201

(22) Filed: Dec. 21, 2012

(65) Prior Publication Data
US 2013/0107115 A1    May 2, 2013

Related U.S. Application Data

(63) Continuation of application No. PCT/JP2012/002688, filed on Apr. 18, 2012.

(30) Foreign Application Priority Data

Jul. 1, 2011  (JP) ................................. 2011-147746

(51) Int. Cl.
*H04N 3/14*   (2006.01)
*H04N 5/335*  (2011.01)
*H04N 5/225*  (2006.01)
*H04N 5/357*  (2011.01)
*H04N 101/00* (2006.01)

(52) U.S. Cl.
CPC ............ *H04N 5/2253* (2013.01); *H04N 5/3577* (2013.01); *H04N 2101/00* (2013.01)

USPC ........... 348/294; 348/298; 348/302; 348/308; 348/312

(58) Field of Classification Search
USPC ......... 348/294–324; 250/208.1; 257/290–292
See application file for complete search history.

(56) References Cited

FOREIGN PATENT DOCUMENTS

| JP | H06-349914 A | 12/1994 |
| JP | 2001-078958 A | 3/2001 |
| JP | 2006-211049 | 8/2006 |
| JP | 2008-131251 A | 6/2008 |
| JP | 2008131251 A * | 6/2008 |
| JP | 2008-211378 A | 9/2008 |
| JP | 2009-060459 A | 3/2009 |
| WO | WO-2009-144898 A1 | 12/2009 |

* cited by examiner

Primary Examiner — Yogesh Aggarwal
(74) Attorney, Agent, or Firm — James W. Judge

(57) ABSTRACT

An imaging device includes: an imaging sensor 110; a main circuit substrate 120 includes a first ground conductor; an imaging sensor cable 130 that includes a second ground conductor, has the imaging sensor 110 mounted thereon, and is connected to the main circuit substrate 120; a metal plate 150 that is disposed between the main circuit substrate 120 and an area of the imaging sensor cable 130 where the imaging sensor 110 is mounted thereon, and that is electrically connected to the second ground conductor; and a ground connection conductor 190 that electrically connects between the first ground conductor and the metal plate 150. The ground connection conductor 190 is disposed in an area where the imaging sensor 110 and the imaging sensor cable 130 overlap each other or in an area where the imaging sensor 110 and the main circuit substrate 120 overlap each other.

11 Claims, 24 Drawing Sheets

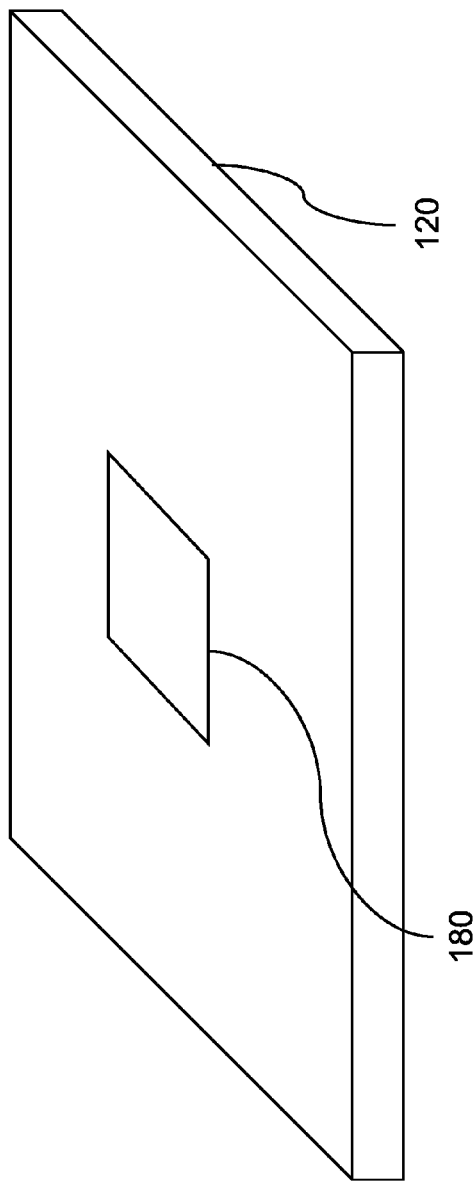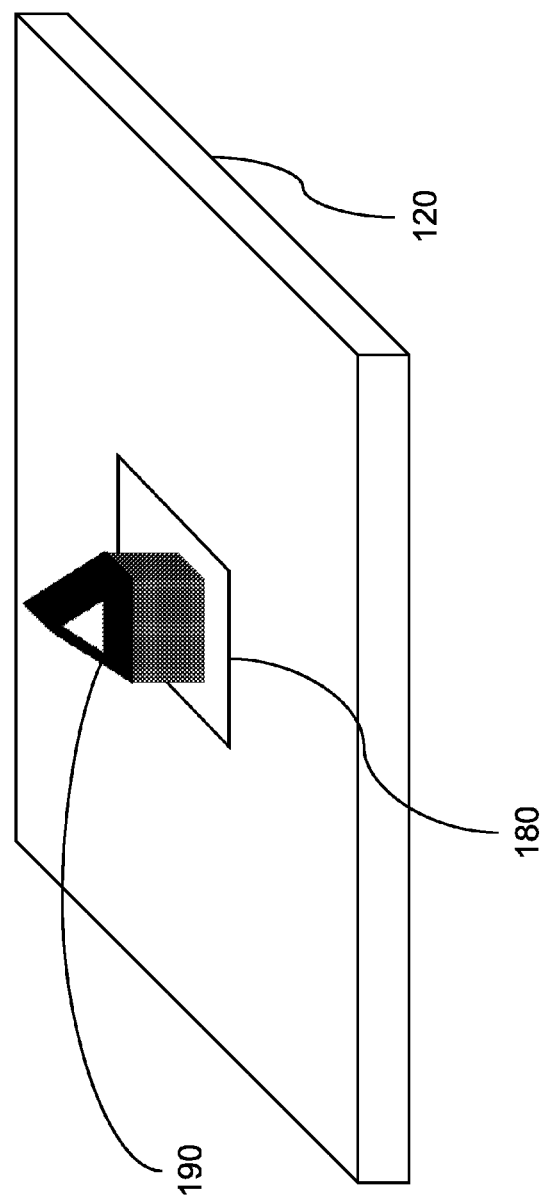

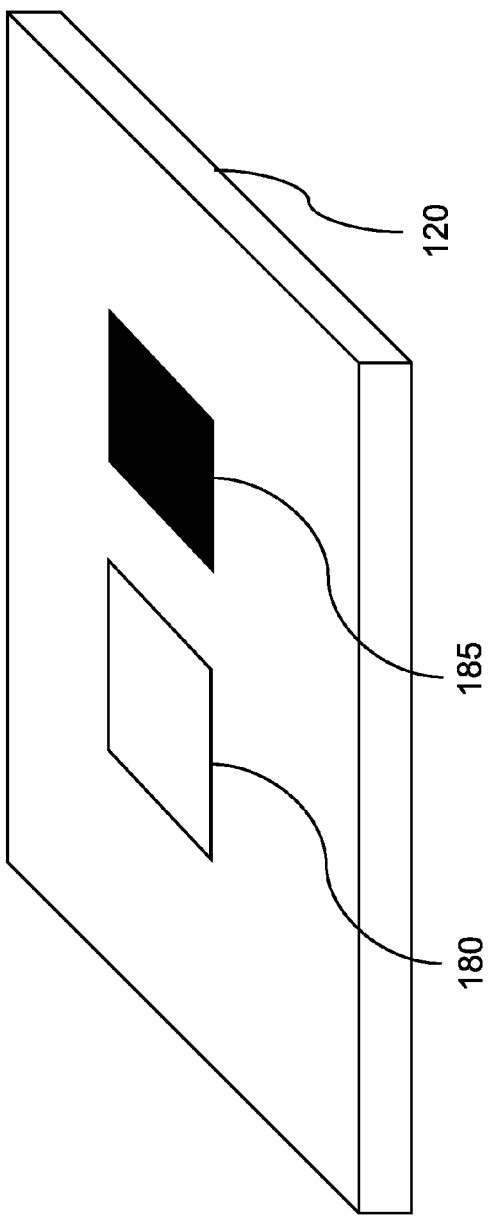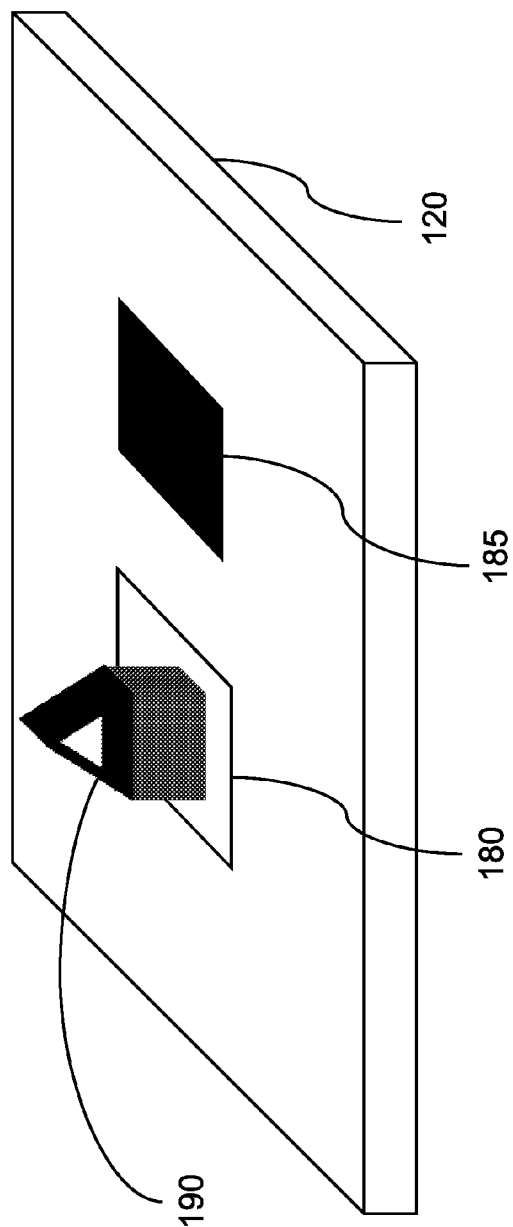

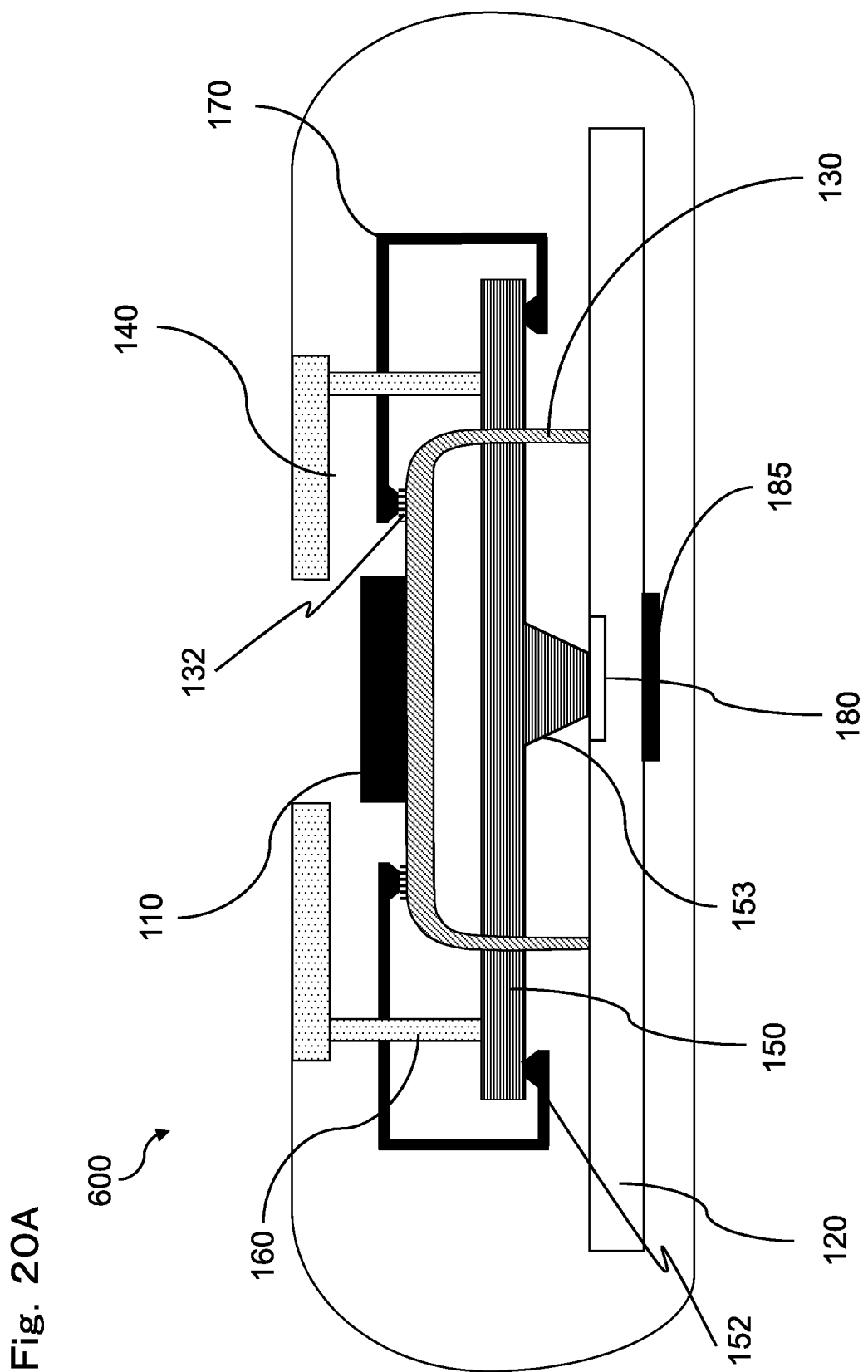

IMAGING DEVICE

BACKGROUND

1. Field

The present disclosure relates to imaging devices such as digital still cameras and the like, and more particularly to imaging devices that allow image interference caused by an external noise to be reduced.

2. Description of the Related Art

In recent years, opportunities are increased in which imaging devices such as digital still cameras and the like are used in environments where portable information terminals, such as mobile telephones and PHSs (personal handyphone systems), which emit electromagnetic waves, are used. Further, there may be opportunities of imaging devices such as digital still cameras and the like being used in environments where intense electromagnetic waves are emitted, e.g. at or near a radio station or a television station.

In a case where the imaging device is used in such an environment, the imaging device is likely to be subjected to an electromagnetic interference. Hereinafter, an environment in which imaging devices are likely to be subjected to such an electromagnetic interference is referred to as an "intense electric field environment". If an imaging device such as a digital still camera is used in the intense electric field environment, an image taken by the imaging device may contain a stripe pattern noise (beat noise), and image interference may be caused.

The higher a performance of an imaging sensor of the imaging device is (the higher the sensitivity of an imaging sensor to be used is), the more significant the image interference is. Further, in an imaging sensor built into an imaging device having been downsized as a result of the sizes of imaging devices being reduced, an amount of coupling of intense electric field noise from the outside is increased, so that the image interference becomes more significant.

Causes of the image interference include entering of an external electromagnetic wave into, for example, an image signal line of an imaging sensor. Thus, as the conventional arts, a structure is disclosed in which an electrically-conductive filter is additionally provided on a surface of a lens, and an imaging sensor is shielded from intense electric field noises which may enter the imaging sensor (see, for example, Japanese Laid-Open Patent Publication No. 2008-211378).

SUMMARY

The inventors of the present disclosure have found that, when an imaging sensor cable has a ground conductor provided therein, a potential of the ground conductor varies due to an external electromagnetic wave, and image interference is caused due to the variation in potential. If the electrically-conductive filter is provided on a surface of a lens as in the conventional imaging device in order to address the variation in potential of the ground conductor, although the variation in potential can be restrained to some degree, an amount of light incident on the lens is reduced, thereby deteriorating an image quality.

Thus, the present disclosure is to make available an imaging device that allows image interference caused by an external noise to be reduced also when the imaging device is used in intense electric field environments.

The present disclosure is directed to an imaging device that allows image interference caused by an external noise to be reduced. In order to attain the aforementioned object, an imaging device of the present disclosure includes: an imaging sensor configured to capture an optical image of an object, and generate image data; a main circuit substrate disposed behind the imaging sensor, the main circuit substrate including a first ground conductor having a ground potential, the main circuit substrate configured to perform signal processing of the image data generated by the imaging sensor; an imaging sensor cable including a second ground conductor having a ground potential, in which the imaging sensor cable has the imaging sensor mounted thereon, and is connected to the main circuit substrate; a metal plate that is disposed between the main circuit substrate and an area of the imaging sensor cable where the imaging sensor is mounted thereon, and that is electrically connected to the second ground conductor; and a ground connection conductor that electrically connects between the first ground conductor and the metal plate. In the imaging device, the ground connection conductor is disposed in an area where the imaging sensor and the imaging sensor cable overlap each other or in an area where the imaging sensor and the main circuit substrate overlap each other.

Further, for example, a metal plate is further provided which is disposed between the main circuit substrate and an area of the imaging sensor cable where the imaging sensor is mounted thereon, and is electrically connected to the second ground conductor. The ground connection conductor electrically connects between the first ground conductor and the second ground conductor by electrically connecting between the metal plate and the first ground conductor.

Further, for example, the imaging sensor cable has the second ground conductor embedded therein, and the metal plate is electrically connected to a ground exposure portion of the second ground conductor, and the ground exposure portion is exposed to an outside. Further, for example, the metal plate has a front-surface-side projection that projects toward the imaging sensor and is connected to the ground exposure portion. Further, for example, a mount formed of a metal material and fixed to a main body casing of the imaging device, and a connection section that electrically connects between the mount and the metal plate, are further provided. Further, for example, an electrically-conductive elastic component formed so as to be elastically deformable, is further provided, and the metal plate and the ground exposure portion are connected to each other by the electrically-conductive elastic component. Further, for example, the ground connection conductor is formed so as to be elastically deformable. Further, for example, the ground connection conductor is a back-surface-side projection that projects from a surface of the metal plate on the main circuit substrate side.

Further, for example, the main circuit substrate has the first ground conductor embedded therein, and, in the main circuit substrate, an introduction portion is formed, as an opening or a cut portion, in a portion of an insulating layer that covers the first ground conductor, on a surface on the imaging sensor side, and the ground connection conductor is connected to the first ground conductor via the introduction portion.

Further, for example, in the main circuit substrate, an integrated circuit for AD conversion for performing digital conversion of the image data is disposed, in an area near the introduction portion, on the same surface as the surface on which the introduction portion is formed. Alternatively, in the main circuit substrate, an integrated circuit for AD conversion for performing digital conversion of the image data is disposed, in an area opposite to an area of the introduction portion, on a surface reverse of the surface on which the introduction portion is formed.

Further, a portion of the ground connection conductor may be disposed in the area where the imaging sensor and the imaging sensor cable overlap each other or in the area where the imaging sensor and the main circuit substrate overlap each other.

As described above, in the imaging device of the present disclosure, since a potential in the second ground conductor of the imaging sensor cable becomes stable, also when the imaging device is used in an intense electric field environment, image interference caused by an external noise can be reduced. These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11A is a perspective view of a main circuit substrate 120;

FIG. 11B is a perspective view of the main circuit substrate 120 to which an electrically-conductive section 190 has been connected;

FIG. 17A is a perspective view of the main circuit substrate 120;

FIG. 17B is a perspective view of the main circuit substrate 120 to which the electrically-conductive section 190 has been connected;

FIG. 20A is a cross-sectional view of an internal structure of an imaging device 600, as viewed from thereabove, according to a sixth embodiment of the present disclosure;

DETAILED DESCRIPTION

Hereinafter, exemplary embodiments of the present disclosure will be described with reference to the drawings.

(First Embodiment)

Figure 1:
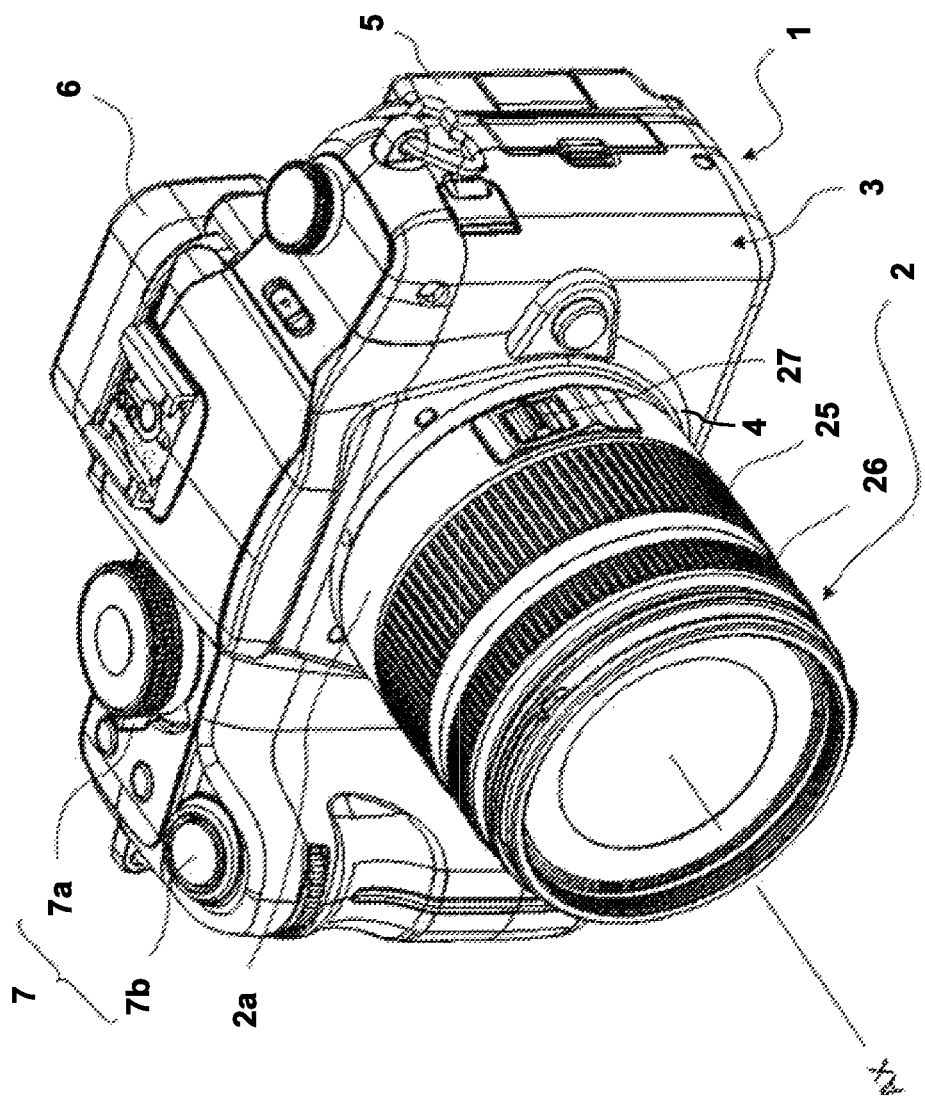
FIG. 1 is a perspective view of an outer appearance of a digital camera (which is an exemplary imaging device) according to a first embodiment of the present disclosure.
Figure 2:
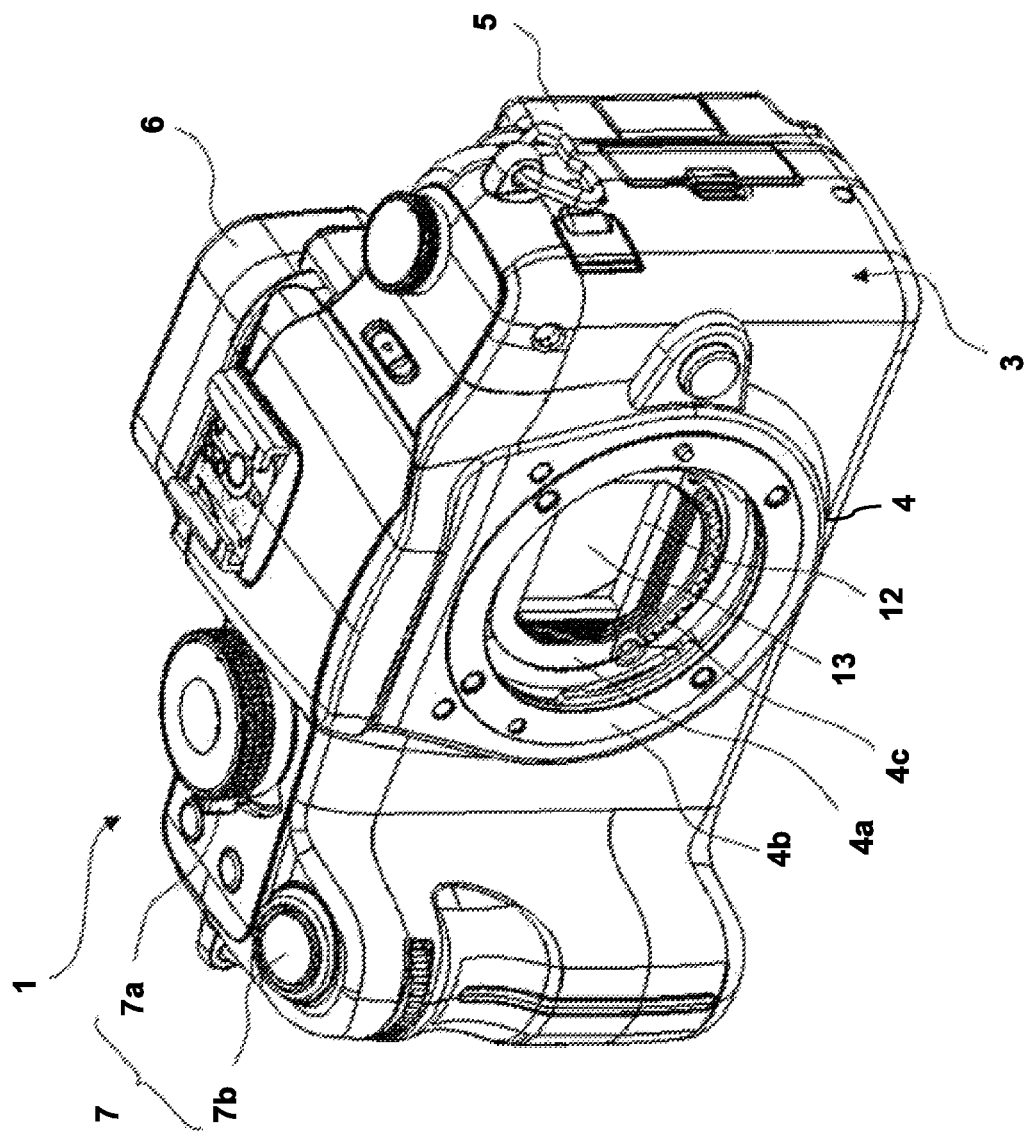
FIG. 2 is a perspective view of an outer appearance of a camera main body 1 from which an exchangeable lens unit 2 is removed.
Figure 3:
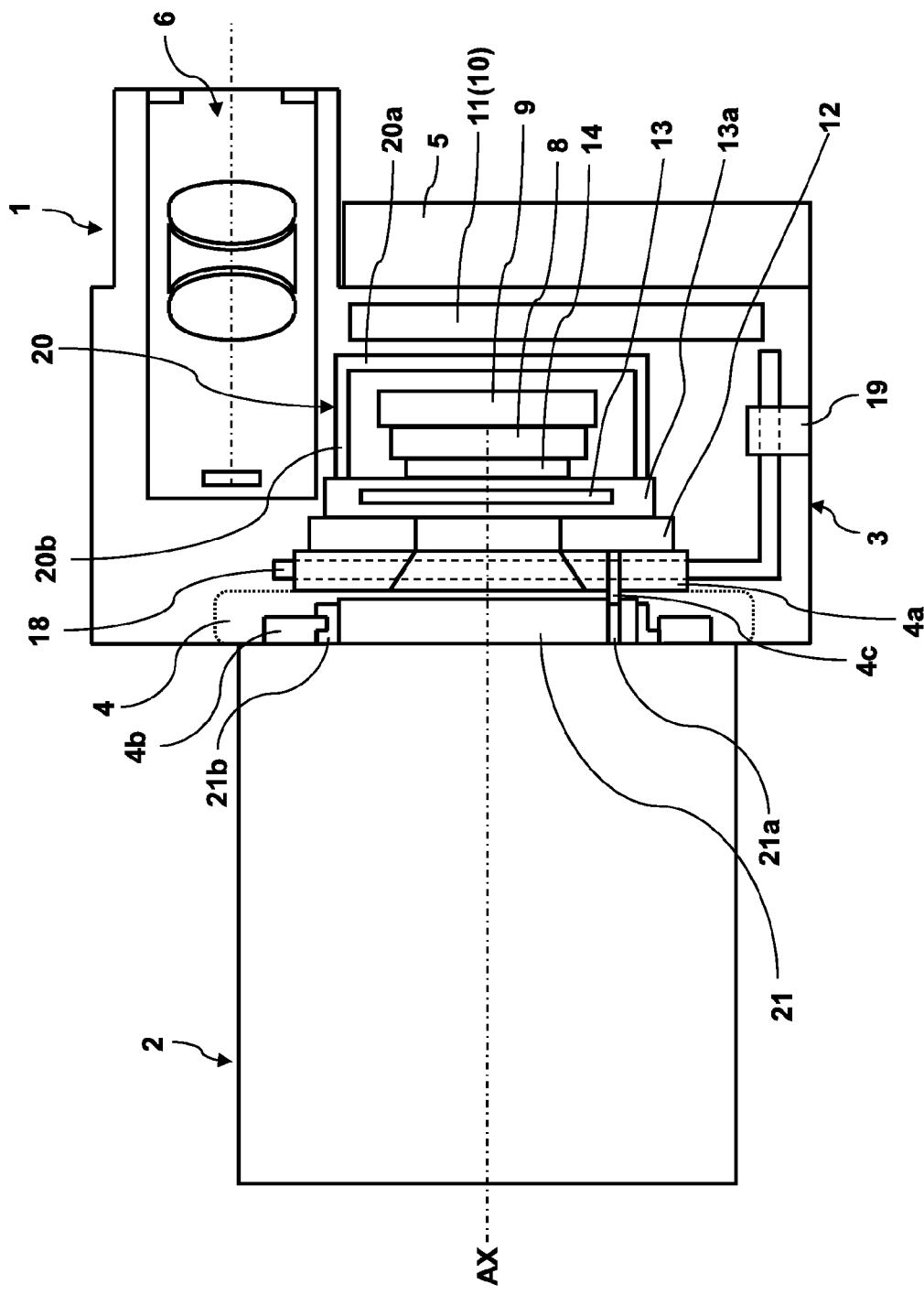
FIG. 3 is a schematic cross-sectional view of an internal structure of the digital camera.
Figure 4:
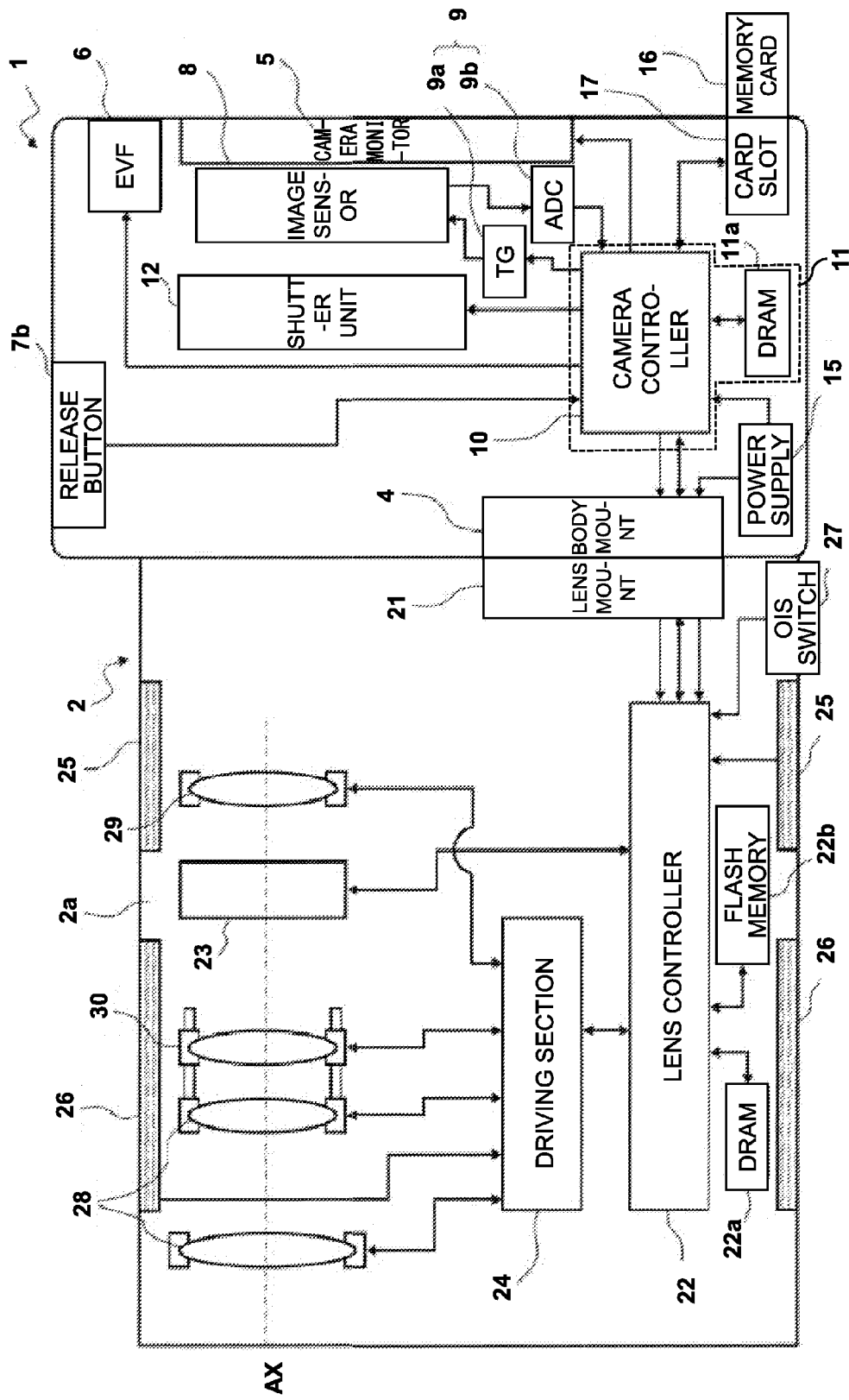
FIG. 4 is a functional block diagram illustrating the digital camera.

FIG. 1 is a perspective view of an outer appearance of a digital camera (which is an exemplary imaging device) according to a first embodiment of the present disclosure. The digital camera according to the first embodiment includes a camera main body 1 and an exchangeable lens unit 2 which is mountable to the camera main body 1. FIG. 2 is a perspective view of an outer appearance of the camera main body 1 from which the exchangeable lens unit 2 is removed. FIG. 3 is a schematic cross-sectional view of an internal structure of the digital camera. FIG. 4 is a functional block diagram illustrating the digital camera.

Firstly, referring to FIG. 1 to FIG. 4, a fundamental structure of the digital camera according to the first embodiment will be described. In the description herein, for convenience of description, an object side of the digital camera is referred to as the front, and an imaging plane side of the digital camera is referred to as the rear or the back.

As shown in FIG. 1, the camera main body 1 includes a main body casing 3, a body mount 4, a camera monitor 5, an electronic view finder (EVF) 6, and an operation section 7. The body mount 4 is disposed on the front surface side of the main body casing 3, and allows the exchangeable lens unit 2 to be mounted to the camera main body 1. The camera monitor 5 is disposed on the back surface side of the main body casing 3, and is implemented as a liquid crystal display or the like. The EVF 6 is disposed on the back surface side of the main body casing 3, and displays, for example, an image represented by display image data. The operation section 7 is disposed on the top portion of the main body casing 3, and includes, for example, a power switch 7a, and a release button 7b that receives a shutter operation from a user.

The exchangeable lens unit 2 has, in a lens barrel 2a made of a resin, an optical system including a group of lenses 28, 29, and 30 that are arrayed on an optical axis AX for forming an optical image of an object. On the outer circumferential portion of the lens barrel 2a, a zoom ring 25, a focus ring 26, and an OIS (Optical Image Stabilizer) switch 27 are provided. In the exchangeable lens unit 2, positions of lenses in the lens barrel 2a can be adjusted by rotating the zoom ring 25 and the focus ring 26.

As shown in FIG. 2, the body mount 4 is structured so as to allow the exchangeable lens unit 2 to be mounted to the camera main body 1. The body mount 4 includes a terminal support section 4a, a body mount ring 4b, and a connection terminal 4c. On the front surface of the camera main body 1 on which the exchangeable lens unit 2 is mounted to the camera main body 1, a shutter unit 12 and a diaphragm 13 are provided.

As shown in FIG. 3, in the main body casing 3 of the camera main body 1, a circuit substrate 9 on which an image sensor 8 implemented as a CMOS (Complementary Metal Oxide Semiconductor) or a CCD (Charge Coupled Device) is mounted, and a main circuit substrate 11 including a camera controller 10, are provided. Further, in the main body casing 3 of the camera main body 1, the body mount 4, the shutter unit 12, the diaphragm 13, an optical low pass filter 14, the image sensor 8, the circuit substrate 9, a metal component 20, the main circuit substrate 11, and the camera monitor 5 are disposed in order, respectively, from the front.

A diaphragm support section 13a supports the diaphragm 13 such that the diaphragm 13 is disposed at a determined position relative to the image sensor 8. The diaphragm support section 13a is supported by a main frame 18 via the body mount 4 and the shutter unit 12. The diaphragm 13 and the diaphragm support section 13a prevent dust from attaching to the image sensor 8.

The optical low pass filter 14 removes a high frequency component of light of an object such that an object image which is formed by the exchangeable lens unit 2 has a resolution lower than that based on pitches of pixels of the image sensor 8. In general, in an imaging sensor such as the image sensor 8, a color filter, for RGB colors, which includes an array called a Bayer array and/or a complementary color filter for YCM colors, are arranged for each pixel. Thus, if an image of an object is formed with the same resolution as that of the image sensor, not only a false color occurs, but also a moire phenomenon occurs to make viewing difficult in the case of a repeated pattern of an object. Thus, the optical low pass filter 14 is disposed so as to avoid such a problem. The optical low pass filter 14 also has an IR protection filter function for filtering out infrared light.

The main frame 18 that is made of a metal and is disposed in the main body casing 3 is connected to the terminal support section 4a of the body mount 4, and supports the exchangeable lens unit 2 via the body mount 4. Further, a tripod mounting section 19 having a screw hole for mounting a tripod is mechanically connected to the main frame 18. The screw hole of the tripod mounting section 19 is exposed on the bottom surface of the main body casing 3. Further, the metal component 20 disposed so as to surround the circuit substrate 9 to which the image sensor 8 has been mounted is a component for enhancing dissipation of heat generated in the image sensor 8. The metal component 20 includes a metal plate 20a (orthogonal to the optical axis AX) disposed between the circuit substrate 9 and the main circuit substrate 11, and a thermally-conductive section 20b (parallel to the optical axis AX) for transferring heat from the metal plate 20a to the body mount 4.

The body mount 4 is a component for mounting the exchangeable lens unit 2 to the camera main body 1. The body mount 4 is mechanically and electrically connected to a lens mount 21 of the exchangeable lens unit 2. The body mount 4 includes: the body mount ring 4b that is made of a metal, is ring-shaped, and is mounted to the front surface of the main body casing 3; and the connection terminal 4c provided in the terminal support section 4a. A connection terminal 21a provided in the lens mount 21 is electrically connected to the connection terminal 4c when the exchangeable lens unit 2 is mounted to the camera main body 1.

The body mount ring 4b of the body mount 4 and a lens mount ring 21b that is made of a metal and is provided in the lens mount 21 of the exchangeable lens unit 2, fit into each other, whereby the exchangeable lens unit 2 is mechanically held by the camera main body 1. The lens mount ring 21b fits into the body mount ring 4b by means of a so-called bayonet mechanism.

Specifically, the lens mount ring 21b is put into a first state in which the lens mount ring 21b does not fit into the body mount ring 4b or a second state in which the lens mount ring 21b fits into the body mount ring 4b, according to a relationship in rotated position about the optical axis between the body mount ring 4b and the lens mount ring 21b. In the first state, the lens mount ring 21b is movable relative to the body mount ring 4b in the optical axis direction, and can be inserted into the body mount ring 4b. When the lens mount ring 21b is rotated relative to the body mount ring 4b in a state where the lens mount ring 21b has been inserted into the body mount ring 4b, the lens mount ring 21b fits into the body mount ring 4b. At this time, a relationship in rotated position between the body mount ring 4b and the lens mount ring 21b represents the second state.

Further, the connection terminal 4c electrically contacts with the connection terminal 21a of the lens mount 21 in a state where the exchangeable lens unit 2 is mounted to the camera main body 1. Thus, the body mount 4 and the lens mount 21 are electrically connected to each other via the connection terminal 4c of the body mount 4 and the connection terminal 21a of the lens mount 21. As a result, in the digital camera, image data signals and control signals can be transmitted and received between the camera main body 1 and the exchangeable lens unit 2 via the body mount 4 and the lens mount 21.

Referring to FIG. 4, an internal function of the camera main body 1 will be firstly described in detail.

The body mount 4 and the lens mount 21 are connected to each other such that image data and control signals can be transmitted and received between the camera controller 10 and a lens controller 22 provided in the exchangeable lens unit 2. Further, in the main body casing 3, a power supply block 15 implemented as, for example, a battery is provided for supplying power to each component such as the camera controller 10. The power supply block 15 also supplies power to the entirety of the exchangeable lens unit 2 via the body mount 4 and the lens mount 21.

The image sensor 8 operates based on a timing signal supplied from a timing signal generator (TG) 9a mounted to the circuit substrate 9, and converts, to image data, an object image which is an optical image of an object obtained via the exchangeable lens unit 2, to generate still image data, moving image data, or the like. Image data, such as the still image data or moving image data, generated by the image sensor 8 is converted to a digital signal by an ADC (analog-to-digital converter) 9b mounted to the circuit substrate 9, and is subjected to various image processing by the camera controller 10. The various image processing performed by the camera controller 10 includes, for example, a gamma correction process, a white balance correction process, a flaw correction process, a YC conversion process, an electronic zoom process, and a JPEG compression process. The function of the circuit substrate 9 may be included in the main circuit substrate 11.

Further, the image data generated by the image sensor 8 is used for displaying a through-the-lens image. The through-the-lens image is an image represented by moving image data, and the data of the through-the-lens-image is not stored in a memory card 16. The through-the-lens image is displayed on the camera monitor 5 and/or the EVF 6 in order to compose a moving image or a still image.

The camera controller 10 is mounted to the main circuit substrate 11. The camera controller 10 controls each component of the camera main body 1, and transmits a signal for controlling the exchangeable lens unit 2, to the lens controller 22, via the body mount 4 and the lens mount 21. On the other hand, the camera controller 10 receives various signals from the lens controller 22 via the body mount 4 and the lens mount 21. Thus, the camera controller 10 indirectly controls each component of the exchangeable lens unit 2.

Further, the camera controller 10 uses, as a work memory, a DRAM 11a mounted to the main circuit substrate 11 during a control operation and an image processing operation. Further, a card slot 17 is formed for inputting from and outputting to the memory card 16 mounted to the camera main body 1 still image data and moving image data, according to a control signal transmitted from the camera controller 10.

The shutter unit 12 is a so-called focal plane shutter. The shutter unit 12 is disposed between the body mount 4 and the image sensor 8, and can shield the image sensor 8 from light. The shutter unit 12 includes a first shutter curtain, a second shutter curtain, and a shutter support frame having an opening through which light is guided from an object to the image sensor 8. The shutter unit 12 moves to or retracts from the opening of the shutter support frame the first shutter curtain and the second shutter curtain, to adjust an exposure time of the image sensor 8.

Next, an internal function of the exchangeable lens unit 2 will be described in detail.

The exchangeable lens unit 2 has, in the lens barrel 2a made of a resin, the optical system including a group of lenses 28, 29, and 30 arrayed on the optical axis AX for forming an optical image of an object, the lens mount 21, the lens controller 22, an aperture unit 23, and a driving section 24 for driving the group of lenses 28, 29, and 30 of the optical system.

Further, the zoom ring 25, the focus ring 26, and the OIS switch 27 are provided on the outer circumferential portion of the lens barrel 2a. The exchangeable lens unit 2 is allowed to adjust positions of the lenses in the lens barrel 2a by the zoom ring 25 and the focus ring 26 being rotated.

The optical system has a group of lenses 28 for zooming, a group of lenses 29 for OIS, and a group of lenses 30 for focusing. The group of lenses 28 for zooming operates so as to change a focal distance of the optical system. The group of lenses 29 for OIS operates so as to restrain, for the image sensor 8, blurring of an object image which is formed by the optical system. The group of lenses 30 for focusing operates so as to change a focus state of an object image formed on the image sensor 8 by the optical system.

The aperture unit 23 is a light amount adjustment component that adjusts an amount of light transmitted through the optical system. Specifically, the aperture unit 23 includes aperture blades that can block a portion of light beams transmitted through the optical system, and an aperture driving section for driving the aperture blades.

The driving section 24 drives the group of lenses 28, 29, and 30 of the optical system described above, based on a control signal from the lens controller 22. The driving section 24 has a detection section for detecting positions of the group of lenses 28, 29, and 30 of the optical system.

The lens controller 22 controls the entirety of the exchangeable lens unit 2 based on a control signal transmitted from the camera controller 10 of the camera main body 1. The lens controller 22 receives positional information of the group of lenses 28, 29, and 30 of the optical system as detected by the detection section of the driving section 24, and transmits the positional information to the camera controller 10. The camera controller 10 generates a control signal for controlling the driving section 24 based on the positional information received from the lens controller 22, and transmits the control signal to the lens controller 22.

The lens controller 22 transmits, to the driving section 24, the control signal generated by the camera controller 10. The driving section 24 adjusts positions of the group of lenses 28, 29, and 30 based on the control signal transmitted from the lens controller 22.

The camera controller 10 generates a control signal for operating the aperture unit 23, based on information indicating, for example, an amount of light received by the image sensor 8, whether a still image is to be photographed or a moving image is to be photographed, and whether or not an operation is being performed so as to preferentially set an aperture value. At this time, the lens controller 22 relays the control signal generated by the camera controller 10, to the aperture unit 23.

A DRAM 22a and a flash memory 22b are held in the exchangeable lens unit 2. The lens controller 22 uses the DRAM 22a as a work memory when drives the group of lenses 28, 29, and 30 of the optical system and the aperture unit 23. In the flash memory 22b, programs and parameters used by the lens controller 22 are stored.

Thus, the digital camera (which is an exemplary imaging device) according to the first embodiment has been described with reference to FIG. 1 to FIG. 4. However, the imaging device may be another imaging device which utilizes control of a GND potential in an imaging sensor flexible cable (imaging sensor cable) described below, and uses an electrically-conductive section connecting between a metal plate described below, and the main circuit substrate. The "GND" may be represented as "ground" or "earth".

Hereinafter, control of a GND potential in the imaging sensor flexible cable and connection between the metal plate and GND of the main circuit substrate will be described in detail as means for reducing image interference caused by an external noise.

Figure 5:
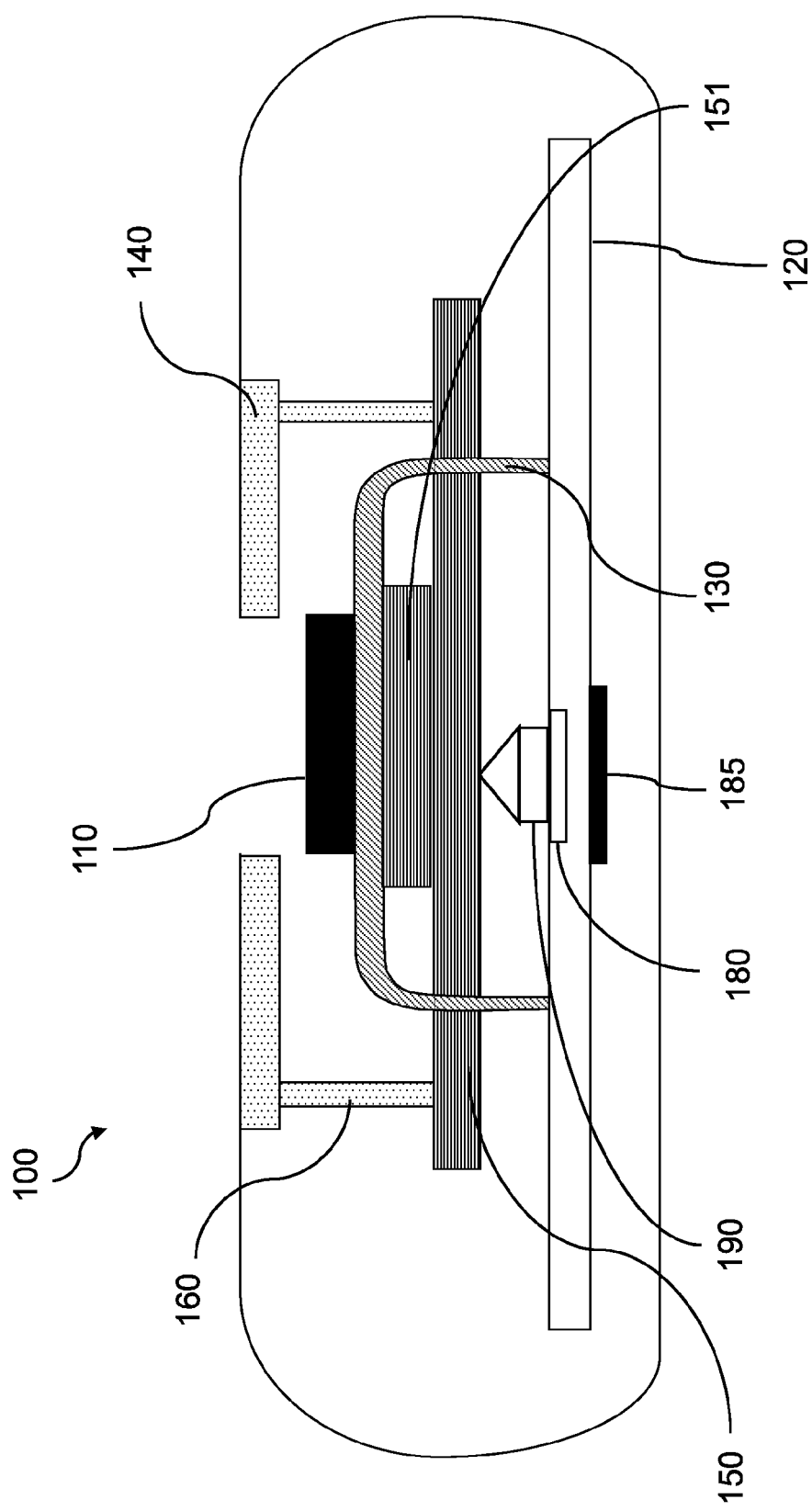
FIG. 5 is a cross-sectional view of an internal structure of an imaging device 100, as viewed from thereabove, according to the first embodiment of the present disclosure.

FIG. 5 is a cross-sectional view of an internal structure of an imaging device 100, as viewed from thereabove, according to the first embodiment. In the description herein, control of a GND potential in an imaging sensor flexible cable 130 and control of a GND potential in a metal plate 150 will be mainly described, and detailed description of matters other than the controls is omitted. A fundamental structure of the imaging device 100 is the same as described for the digital camera with reference to FIG. 1 to FIG. 4.

As shown in FIG. 5, the imaging device 100 includes an imaging sensor 110, a main circuit substrate 120, the imaging sensor flexible cable 130, a mount 140, the metal plate 150, connection sections 160, and an electrically-conductive section 190 (ground connection conductor). The electrically-conductive section 190 is formed of a metal having a high electrical conductivity. The imaging sensor flexible cable 130 has GND exposure portions 131 described below. The metal plate 150 has metal plate projections 151 (front-surface-side projections). The main circuit substrate 120 has a GND removal portion 180 (introduction portion) described below on the front surface on the metal plate 150 side. Further, the main circuit substrate 120 has an AD conversion LSI 185 for performing a digital conversion of image data generated by the imaging sensor 110, on the back surface on a side opposite to the metal plate 150 side.

The imaging sensor 110 is implemented as, for example, a CMOS or a CCD, and corresponds to the image sensor 8 described above. On the front surface of the imaging sensor 110, an object image which is an optical image of an object obtained via the group of lenses 28, 29, and 30, is formed. The imaging sensor 110 converts the object image to image data, to generate still image data, moving image data, or the like.

The main circuit substrate 120 corresponds to the main circuit substrate 11 described above. The main circuit substrate 120 includes the camera controller 10 that performs various signal processing of the image data generated by the imaging sensor 110. In the description herein, the various signal processing is the image processing described above, and includes, for example, a gamma correction process, a white balance correction process, a flaw correction process, a YC conversion process, an electronic zoom process, and a JPEG compression process. The main circuit substrate 120 is a rectangular substrate having an area greater than that of the imaging sensor 110. The main circuit substrate 120 is fixed to the main body casing 3 behind the imaging sensor 110 so as to be almost parallel to the imaging sensor 110. Further, the main circuit substrate 120 is a multilayered substrate having a GND layer formed thereinside. On the main circuit substrate 120, the GND removal portion 180 (a so-called land) is formed as an exposed portion of the GND layer (a first GND conductor) by a portion of an insulating layer that covers the GND layer being removed.

Figure 6:
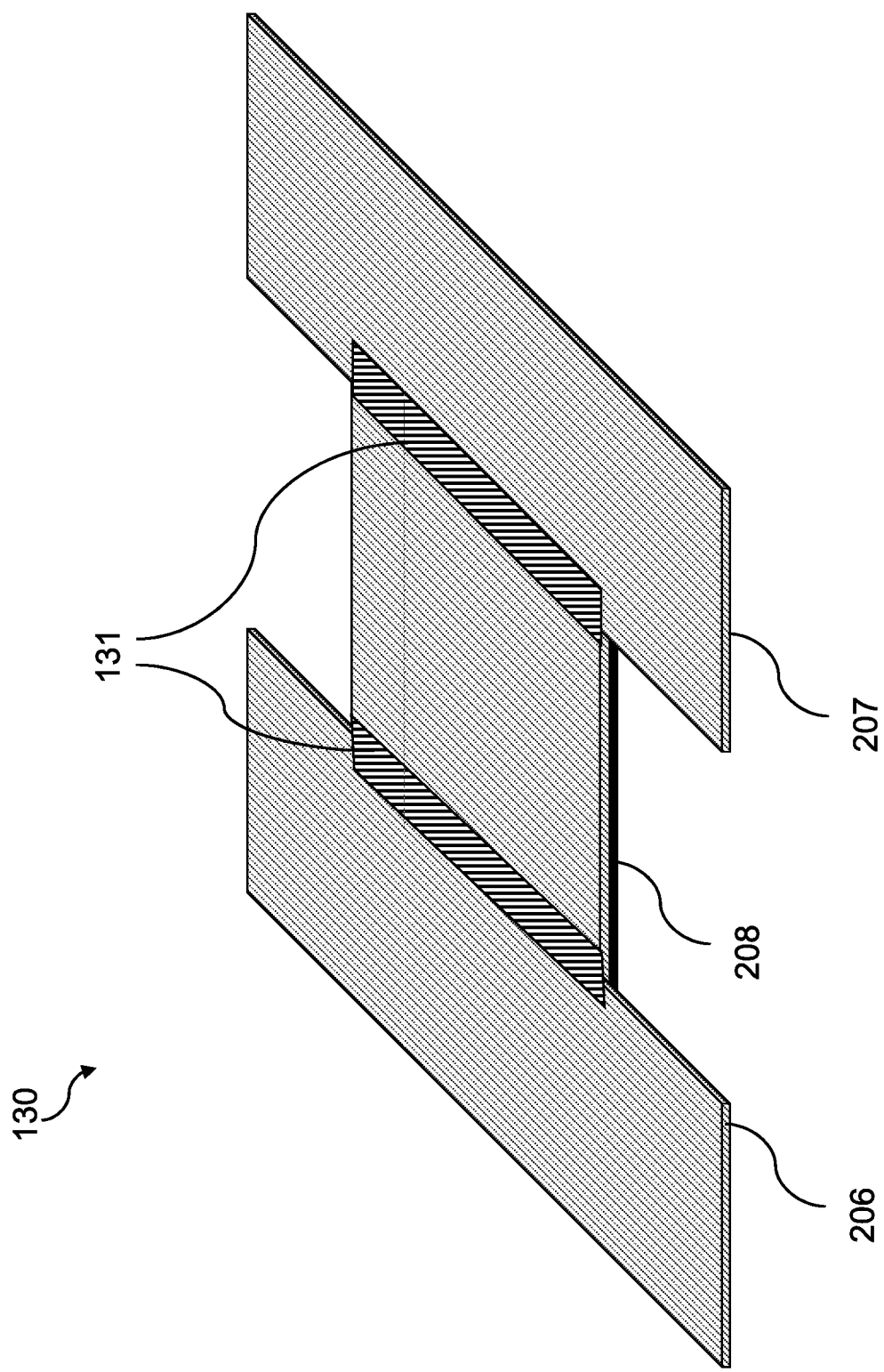
FIG. 6 is a perspective view of an imaging sensor flexible cable 130.

As shown in FIG. 6, the imaging sensor flexible cable 130 has four cable end connection portions 205 that are connected to the main circuit substrate 120, and is formed so as to be roughly H-shaped. The imaging sensor flexible cable 130 includes a pair of band portions 206 and 207 each having the cable end connection portions 205 on both ends, and a rectangular central connection portion 208 connecting between central portions of the paired band portions 206 and 207. The paired band portions 206 and 207 are spaced from each other and extend parallel to each other. In the imaging sensor flexible cable 130, the band portions 206 and 207 correspond to longitudinal lines, respectively, of the H shape, and the central connection portion 208 corresponds to a transverse line of the H shape. The imaging sensor flexible cable 130 corresponds to, for example, the circuit substrate 9 described above, and allows the imaging sensor 110 to be mounted on the central connection portion 208. The imaging sensor 110 is mounted so as to protrude from the central connection portion 208 toward each of the band portions 206 and 207. A plurality of signal lines 209 are embedded in each of the band portions 206 and 207 so as to extend from each cable end connection portion 205 to the imaging sensor 110. The imaging sensor flexible cable 130 is supported by the main circuit substrate 120 by each cable end connection portion 205 being connected to the main circuit substrate 120. In the imaging sensor flexible cable 130, an area in which the imaging sensor 110 is mounted is an imaging sensor mounting area 211.

Further, the imaging sensor flexible cable 130 includes an imaging sensor flexible cable GND. Specifically, the imaging sensor flexible cable 130 is a cable having embedded therein a cable signal layer 221 shown in FIG. 8 and a cable GND layer 222 shown in FIG. 9. An insulating layer is disposed between the cable signal layer 221 and the cable GND layer 222. The imaging sensor flexible cable 130 has the GND exposure portions 131 at which the cable GND layer 222 or a conductor that is electrically connected to the cable GND layer 222, is exposed. The GND exposure portions 131 are a part of the imaging sensor flexible cable GND (a second GND conductor). The GND exposure portions 131 are connected to the metal plate projections 151 that project from the front surface of the metal plate 150.

The mount 140 corresponds to, for example, the body mount 4 described above. The mount 140 is a component for allowing the lens unit 2 to be mounted to the main body casing 3. The mount 140 is fixed to the main body casing 3 and has a GND potential. The mount 140 also secures an SSWF (Super Sonic Wave Filter) (not shown) for removing dust on the surface of the imaging sensor 110, a shutter unit (not shown), and a flash unit (not shown). Further, the mount 140 is formed of a metal material such as aluminum or a stainless steel (SUS), in order to enhance reliability in heat-dissipation and reliability against drop impact, and to address unnecessary electromagnetic radiation.

Figure 7:
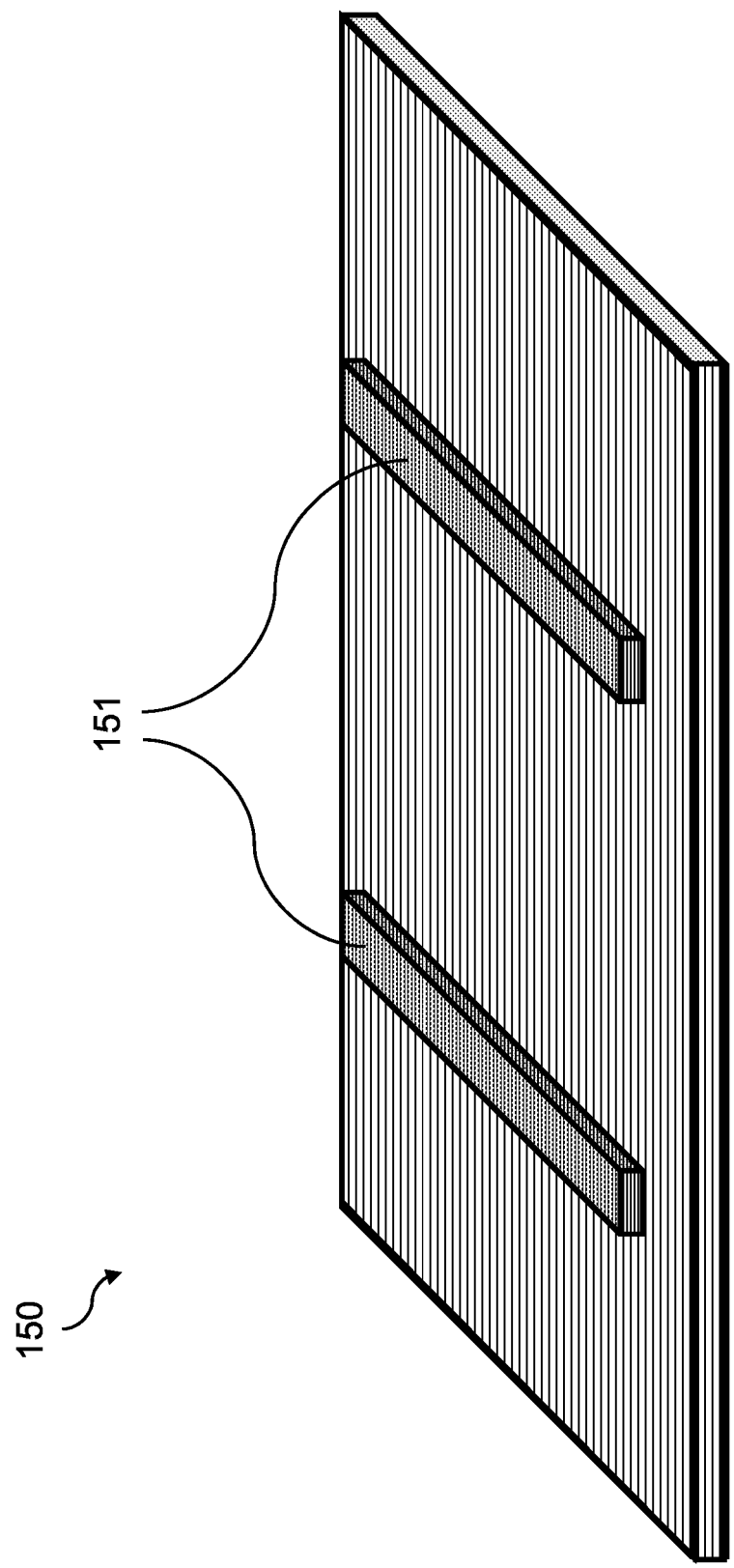
FIG. 7 is a perspective view of a metal plate 150.

The metal plate 150 is formed in a roughly rectangular shape as shown in FIG. 7. The metal plate 150 is disposed between the imaging sensor 110 and the main circuit substrate 120. The metal plate 150 is provided so as to be almost parallel to the main circuit substrate 120. The metal plate projections 151 that project toward the imaging sensor 110 are provided on the front surface of the metal plate 150. The metal plate projections 151 are electrically connected to the GND exposure portions 131 of the imaging sensor flexible cable 130. Connection portions between the GND exposure portions 131 and the metal plate projections 151 will be described below in detail.

Further, the metal plate 150 including the metal plate projections 151 corresponds to, for example, the metal plate 20a of the metal component 20 described above. The metal plate 150 is fixed to the imaging sensor mounting area 211 or disposed near the imaging sensor mounting area 211, in order to transfer heat generated in the imaging sensor 110. In the first embodiment, the metal plate 150 is adhered to a reverse side surface of the imaging sensor mounting area 211. The metal plate 150 is formed of a metal material, such as aluminum or copper, having a high thermal conductivity and electrical conductivity, to efficiently dissipate heat transferred from the imaging sensor 110.

The connection sections 160 are components that electrically connect between the mount 140 and the metal plate 150. The connection sections 160 allow a difference in potential between the mount 140 and the metal plate 150 to be reduced. The connection sections 160 are typically screws made of a metal material. The number of the connection sections 160 provided is plural. The connection sections 160 fix the mount 140 and the metal plate 150.

Next, connection portions between the GND exposure portions 131 and the metal plate projections 151 will be specifically described. FIG. 6 is a perspective view of the imaging sensor flexible cable 130. The imaging sensor flexible cable 130 has the cable signal layer 221 and the cable GND layer 222 provided in an insulator. An insulating layer is provided between the cable signal layer 221 and the cable GND layer 222. The cable signal layer 221 is disposed so as to be closer to the metal plate 150 side than the cable GND layer 222. In FIG. 6, the imaging sensor flexible cable 130 has the GND exposure portions 131. The surface of the imaging sensor flexible cable 130 is formed as an insulating layer such as a resist in order to protect the surface. The GND exposure portions 131 are areas in which the resist is removed. The GND exposure portions 131 are connected to the metal plate projections 151 of the metal plate 150. In the first embodiment, the number of the GND exposure portions 131 provided is two. A shape of each GND exposure portion 131 is rectangular. The two GND exposure portions 131 are formed parallel to each other such that the imaging sensor mounting area 211 is sandwiched therebetween. Each GND exposure portion 131 is formed at or near the imaging sensor mounting area 211 on the bottom surface of the imaging sensor flexible cable 130. The metal plate projections 151 are connected to the imaging sensor flexible cable 130 at or near the imaging sensor 110. The GND exposure portions 131 and the metal plate projections 151 may not be bonded to each other, and may merely contact with each other. Further, in the imaging sensor flexible cable 130, the second ground conductor may not be implemented as the cable GND layer 222. The second ground conductor may be, for example, a ground line provided along the signal lines. Further, the number of the GND exposure portions 131 may be one.

FIG. 7 is a perspective view of the metal plate 150. As shown in FIG. 7, the metal plate 150 has the metal plate projections 151. The metal plate projections 151 are formed based on the shapes and positions of the GND exposure portions 131 of the imaging sensor flexible cable 130 as shown in FIG. 6. In the first embodiment, the metal plate projections 151 are provided at positions corresponding to the positions of the GND exposure portions 131, respectively. In FIG. 7, the top surfaces of the metal plate projections 151 are connection surfaces at which each metal plate projection 151 connects to a corresponding one of the GND exposure portions 131. The connection surface of each metal plate projection 151 has almost the same size and shape as those of a corresponding one of the GND exposure portions 131. The positions and shapes of the GND exposure portions 131 and the metal plate projections 151 are not limited to those shown in FIG. 6 and FIG. 7. The positions and shapes of the GND exposure portions 131 and the metal plate projections 151 may be different from the positions and shapes shown in FIG. 6 and FIG. 7, and may be any positions and shapes that allow the GND exposure portions 131 and the metal plate projections 151 to be electrically connected to each other.

Further, as described above, the mount 140 and the metal plate 150 are fixed by means of the connection sections 160. Favorably, the connection sections 160 fix the mount 140 and the metal plate 150 such that the GND exposure portions 131 and the metal plate projections 151 are in close contact with each other.

Figure 8:
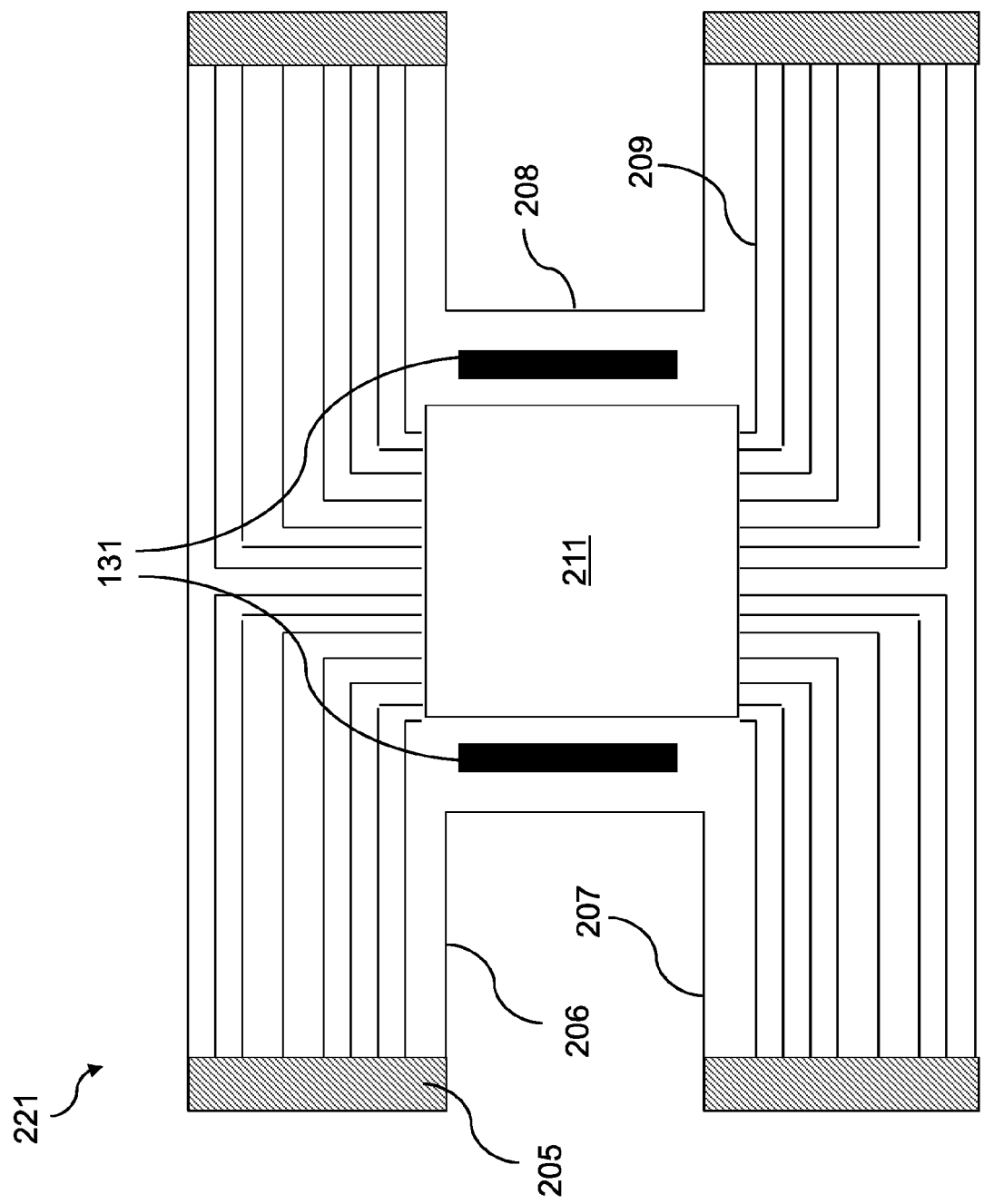
FIG. 8 illustrates an exemplary signal layer of the imaging sensor flexible cable 130.

FIG. 8 illustrates an example of the cable signal layer 221 of the imaging sensor flexible cable 130. As shown in FIG. 8, the imaging sensor mounting area 211 for mounting the imaging sensor 110 is provided at the central portion of the imaging sensor flexible cable 130. At ends of the imaging sensor flexible cable 130, the cable end connection portions 205 are provided as connection sections, respectively, that connect to the main circuit substrate 120.

Further, in the cable signal layer 221 of the imaging sensor flexible cable 130, the plurality of signal lines 209 are provided between the imaging sensor mounting area 211 and the cable end connection portions 205. In the cable signal layer 221, rectangular conductors are provided as the GND exposure portions 131 in an area in which the signal line 209 is not provided. The outer surfaces of the GND exposure portions 131 are connected to the metal plate projections 151 of the metal plate 150. The inner surfaces of the GND exposure portions 131 are electrically connected to the cable GND layer 222 through via holes (not shown) that are pillar-shaped conductors.

Figure 9:
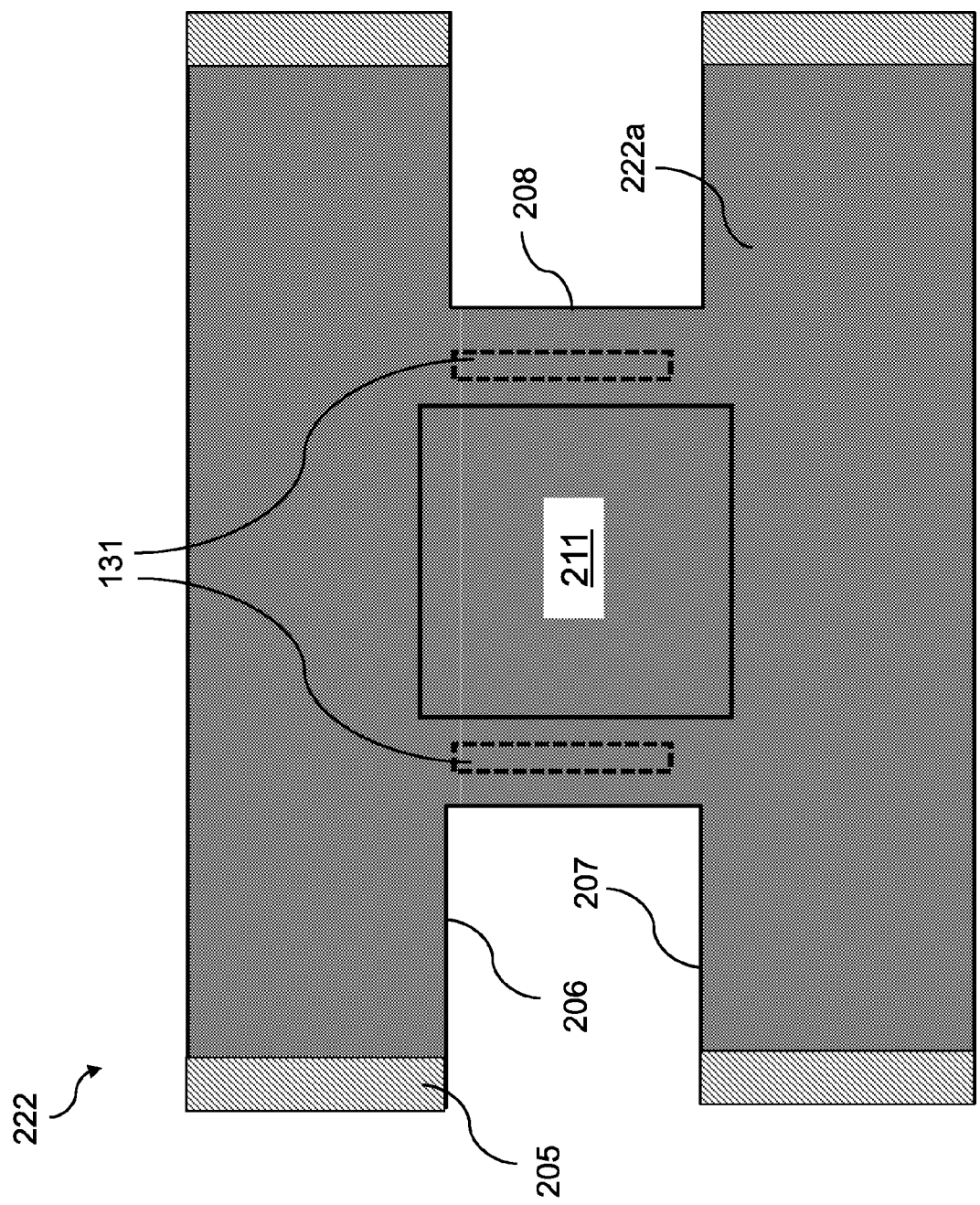
FIG. 9 illustrates an exemplary GND layer of the imaging sensor flexible cable 130.

FIG. 9 illustrates an example of the cable GND layer 222 of the imaging sensor flexible cable 130. As shown in FIG. 9, in the cable GND layer 222, the cable end connection portions 205 are provided at the ends of the imaging sensor flexible cable 130 as connection portions connecting to the ground of the main circuit substrate 120. The entire area of the cable GND layer 222, other than the cable end connection portions 205, is a GND conductor 222a. The surface of the cable GND layer 222 is protected by a resist.

The cable GND layer 222 is electrically connected to the GND exposure portions 131 in the cable signal layer 221 as shown in FIG. 8.

Figure 10:
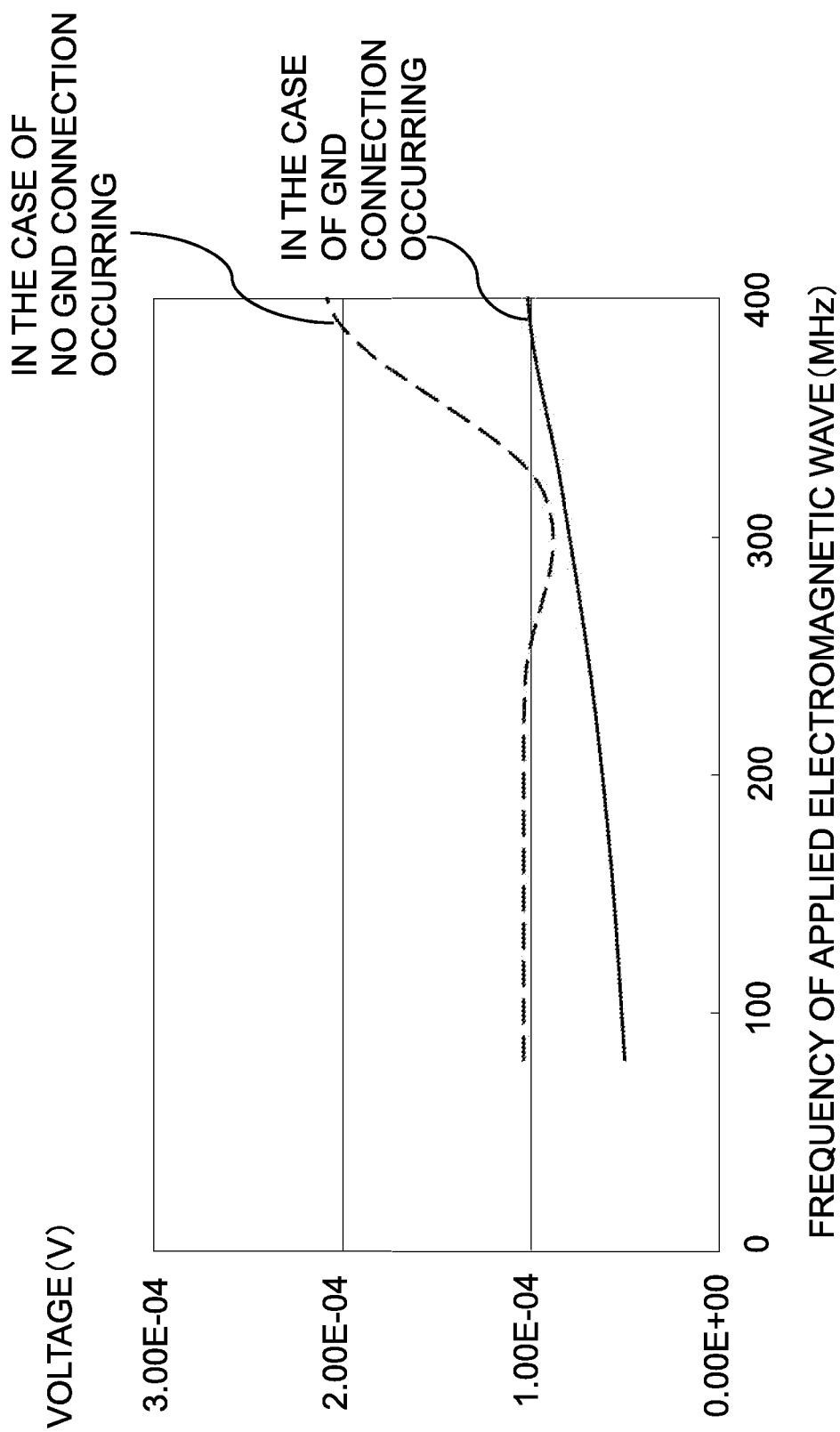
FIG. 10 illustrates voltages induced at a position of an imaging sensor 110 in the case of GND connection occurring between the metal plate 150 and the imaging sensor flexible cable 130, and in the case of no GND connection occurring therebetween.

FIG. 10 illustrates voltages induced at a position of the imaging sensor 110 in the case of GND connection occurring between the metal plate 150 and the imaging sensor flexible cable 130, and in the case of no GND connection occurring therebetween. Specifically, FIG. 10 shows a result of a simulation, obtained by an FDTD (Finite Difference Time Domain) method, of voltages induced at the position of the imaging sensor 110 when a uniform external electromagnetic field is applied to the imaging device 100 at 3 V/m.

In FIG. 10, a horizontal axis represents a frequency of an applied external electromagnetic field, and a vertical axis represents a voltage induced at the position of the imaging sensor 110. A solid line represents a voltage induced in a case where the GND connection occurs between the metal plate 150 and the imaging sensor flexible cable 130. A dashed line represents a voltage induced in a case where no GND connection occurs between the metal plate 150 and the imaging sensor flexible cable 130. The case where no GND connection occurs between the metal plate 150 and the imaging sensor flexible cable 130 represents, for example, a case where the metal plate 150 does not have the metal plate projections 151, and the metal plate 150 is not electrically connected to the GND exposure portions 131 of the imaging sensor flexible cable 130.

As shown in FIG. 10, when the GND connection occurs between the metal plate 150 and the imaging sensor flexible cable 130, a voltage induced at the imaging sensor 110 is reduced as compared to a case where no GND connection occurs between the metal plate 150 and the imaging sensor flexible cable 130. As a result, image interference on an image taken by the imaging device 100 can be reduced.

Next, a connection portion between the main circuit substrate 120 and the electrically-conductive section 190 will be specifically described. FIG. 11A is a perspective view of the main circuit substrate 120. As shown in FIG. 11A, the main circuit substrate 120 has the GND removal portion 180 on the front surface on the metal plate 150 side. The GND removal portion 180 is an area on the front surface of the main circuit substrate 120 in which a resist is removed, and has a GND potential. FIG. 11B is a perspective view of the main circuit substrate 120 to which the electrically-conductive section 190 has been connected. As shown in FIG. 11B, on the main circuit substrate 120, the GND removal portion 180 and the electrically-conductive section 190 are connected to each other. The shape of the electrically-conductive section 190 in a portion where the electrically-conductive section 190 contacts with the metal plate 150 is not limited to the shape as shown in FIG. 5 and FIG. 11B. Favorably, an area of the electrically-conductive section 190 in the portion where the electrically-conductive section 190 contacts with the metal plate 150 is great in light of heat dissipating performance and the like.

The electrically-conductive section 190 is disposed in an area where the imaging sensor 110 and the imaging sensor flexible cable 130 overlap each other, or in an area where the imaging sensor 110 and the main circuit substrate 120 overlap each other. In the present embodiment, the entirety of the electrically-conductive section 190 is disposed in the area where the imaging sensor 110 and the imaging sensor flexible cable 130 overlap each other, or in the area where the imaging sensor 110 and the main circuit substrate 120 overlap each other. However, at least a portion of the electrically-conductive section 190 may be disposed in the area where the imaging sensor 110 and the imaging sensor flexible cable 130 overlap each other, or in the area where the imaging sensor 110 and the main circuit substrate 120 overlap each other.

Further, the electrically-conductive section 190 may be an electrically-conductive elastic section having an elastic function in addition to electrical conductivity. The electrically-conductive elastic section is formed of a metal, such as aluminum or copper, having a high electrical conductivity, in an elastically deformable shape. When the electrically-conductive section 190 has an elastic function, a stress applied to the metal plate 150 adhered to the imaging sensor mounting area is reduced in the case of the electrically-conductive section 190 being pressed against the back surface of the metal plate 150. As a result, generation of stress applied to the imaging sensor 110 is restrained, and, for example, tilting of the imaging sensor 110 can be restrained. Further, in a case where the electrically-conductive section 190 has an elastic function, when the connection sections 160 that support the metal plate 150 are provided with elastic components, tilting of the imaging sensor 110 can be restrained with an enhanced effectiveness.

As described above, in the imaging device 100 according to the first embodiment, since the GND exposure portions 131 of the imaging sensor flexible cable 130 and the metal plate projections 151 of the metal plate 150 are electrically connected to each other, an impedance of GND in the imaging sensor flexible cable 130 can be reduced. As a result, variation in GND potential in the imaging sensor flexible cable 130 can be restrained.

When the metal plate 150 is subjected to an external electromagnetic wave, the metal plate 150 may secondarily radiate the electromagnetic wave. Although heat generated in the imaging sensor 110 is dissipated by means of the metal plate 150, the metal plate 150 may enhance electromagnetic field noises that enter the imaging sensor 110. However, in the first embodiment, since the GND removal portion 180 of the main circuit substrate 120 and the metal plate 150 are electrically connected to each other via the electrically-conductive section 190, an impedance of GND in the metal plate 150 can be reduced. As a result, variation in GND potential in the imaging sensor 110 can be restrained.

Further, in the imaging device 100 according to the first embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the electrically-conductive section 190 is not so large component, and has a simplified internal structure, thereby downsizing the imaging device.

(Second Embodiment)

Figure 12:
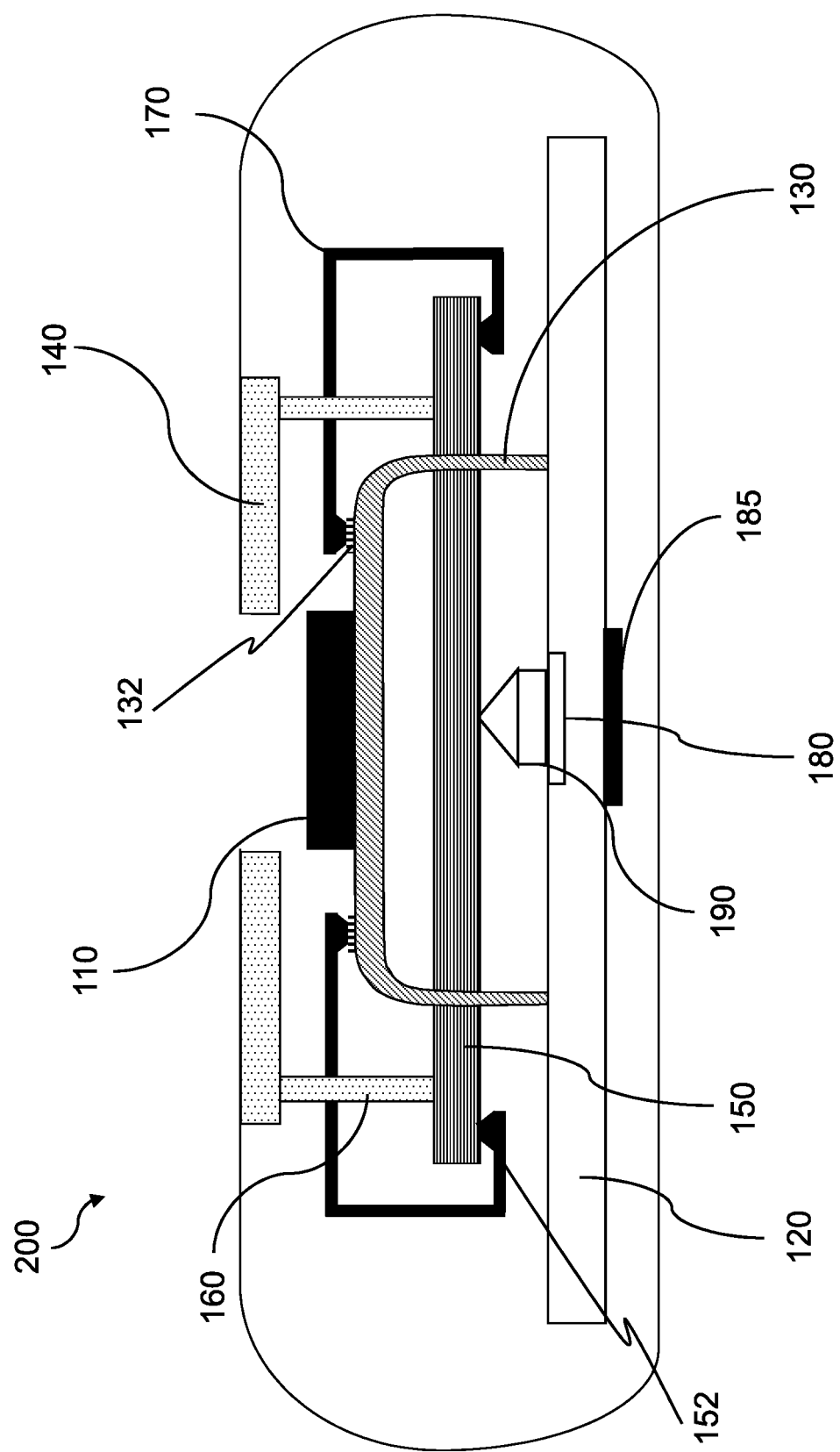
FIG. 12 is a cross-sectional view of an internal structure of an imaging device 200, as viewed from thereabove, according to a second embodiment of the present disclosure.

FIG. 12 is a cross-sectional view of an internal structure of an imaging device 200, as viewed from thereabove, according to a second embodiment of the present disclosure. For the present embodiment, control of a GND potential in the imaging sensor flexible cable and control of a GND potential in the metal plate will be mainly described, and detailed description of matters other than the controls is omitted. A fundamental structure of the imaging device 200 is the same as that of the digital camera described with reference to FIG. 1 to FIG. 4.

As shown in FIG. 12, the imaging device 200 includes the imaging sensor 110, the main circuit substrate 120, the imaging sensor flexible cable 130, the mount 140, the metal plate 150, the connection sections 160, electrically-conductive elastic sections 170, and the electrically-conductive section 190. The imaging sensor flexible cable 130 has GND exposure portions 132. The metal plate 150 has metal plate recesses 152. Further, the main circuit substrate 120 has the GND removal portion 180 on the front surface on the metal plate 150 side, and has the AD conversion LSI 185 on the back surface on a side opposite to the metal plate 150 side. In FIG. 12, the same components as those of the imaging device 100 according to the first embodiment as shown in FIG. 5 are denoted by the same reference numerals, and detailed description thereof is omitted. For the present embodiment, difference from the first embodiment will be mainly described.

The imaging sensor flexible cable 130 includes an imaging sensor flexible cable GND having a GND potential. A portion of the imaging sensor flexible cable GND is the GND exposure portions 132. The GND exposure portions 132 are electrically connected to the metal plate recesses 152 of the metal plate 150 via the electrically-conductive elastic sections 170 formed so as to be elastically deformable.

The metal plate 150 is disposed between the imaging sensor 110 and the main circuit substrate 120. The metal plate 150 does not have the metal plate projections 151 that project toward the imaging sensor 110 as shown in FIG. 5, but has the metal plate recesses 152 as described above. The electrically-conductive elastic sections 170 are connected to the metal plate 150 at the metal plate recesses 152. Portions at which the metal plate 150 and the electrically-conductive elastic sections 170 are connected to each other at the metal plate recesses 152 will be described below in detail.

Figure 13:
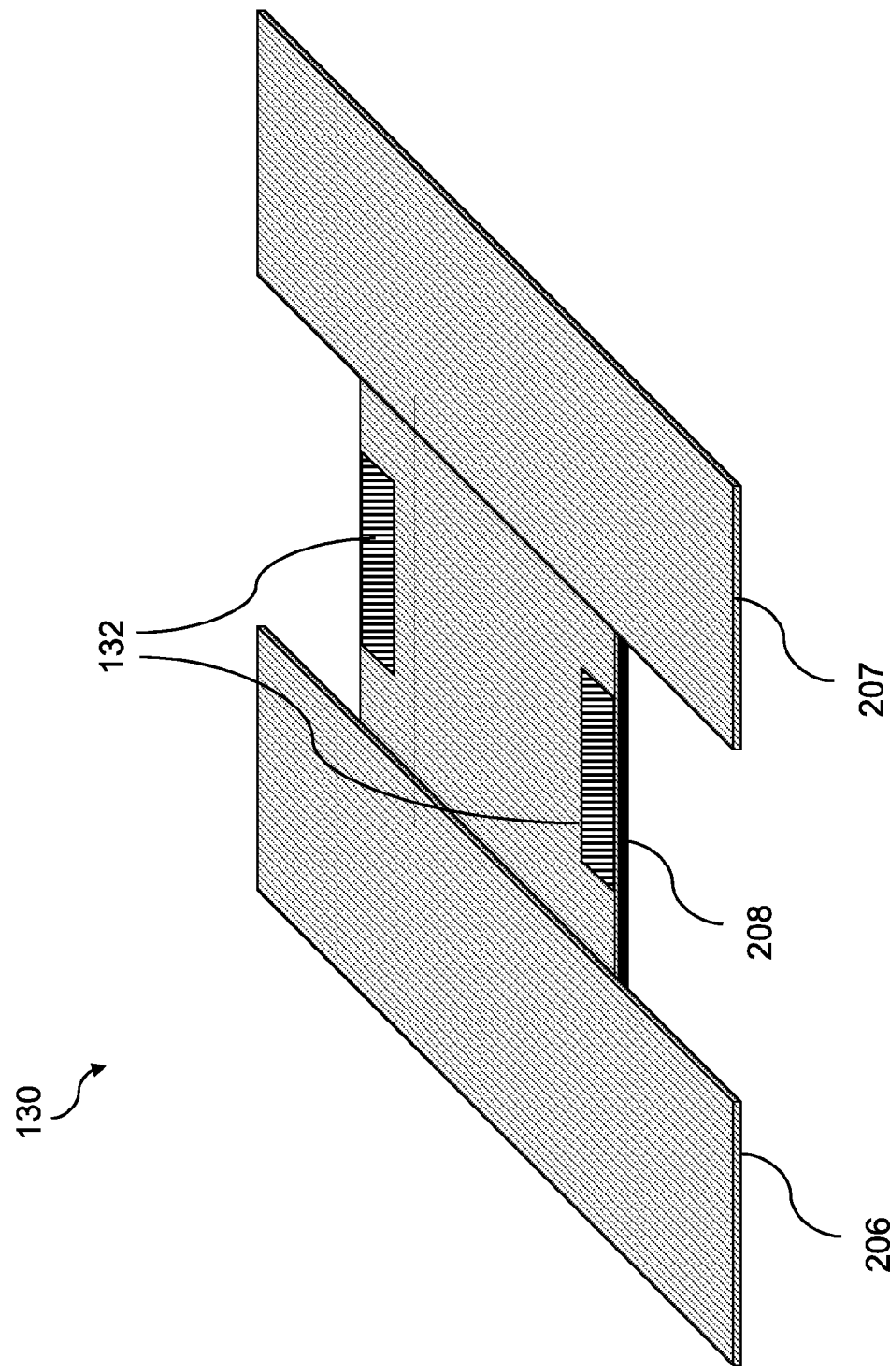
FIG. 13 is a perspective view of the imaging sensor flexible cable 130.

FIG. 13 is a perspective view of the imaging sensor flexible cable 130. As shown in FIG. 13, the imaging sensor flexible cable 130 has the GND exposure portions 132. The surface of the imaging sensor flexible cable 130 is formed as an insulating layer such as a resist, in order to protect the surface. The GND exposure portions 132 are areas in which the resist is removed. The GND exposure portions 132 are formed at or near the imaging sensor mounting area 211 on the top surface of the imaging sensor flexible cable 130.

To the GND exposure portions 132, head portions of the electrically-conductive elastic sections 170 are connected. The electrically-conductive elastic sections 170 are connected to the imaging sensor flexible cable 130 at or near the imaging sensor 110. The GND exposure portions 132 of the imaging sensor flexible cable 130 may be formed as, for example, recessed bottom surfaces so as to correspond to the shapes of the head portions of the electrically-conductive elastic sections 170. The head portions of the electrically-conductive elastic sections 170 and the recessed bottom surfaces (the GND exposure portions 132) are in close contact with each other, thereby stabilizing the connection between the GND exposure portions 132 and the electrically-conductive elastic sections 170 with an enhanced reliability, and restraining image interference with an enhanced effectiveness.

Figure 14:
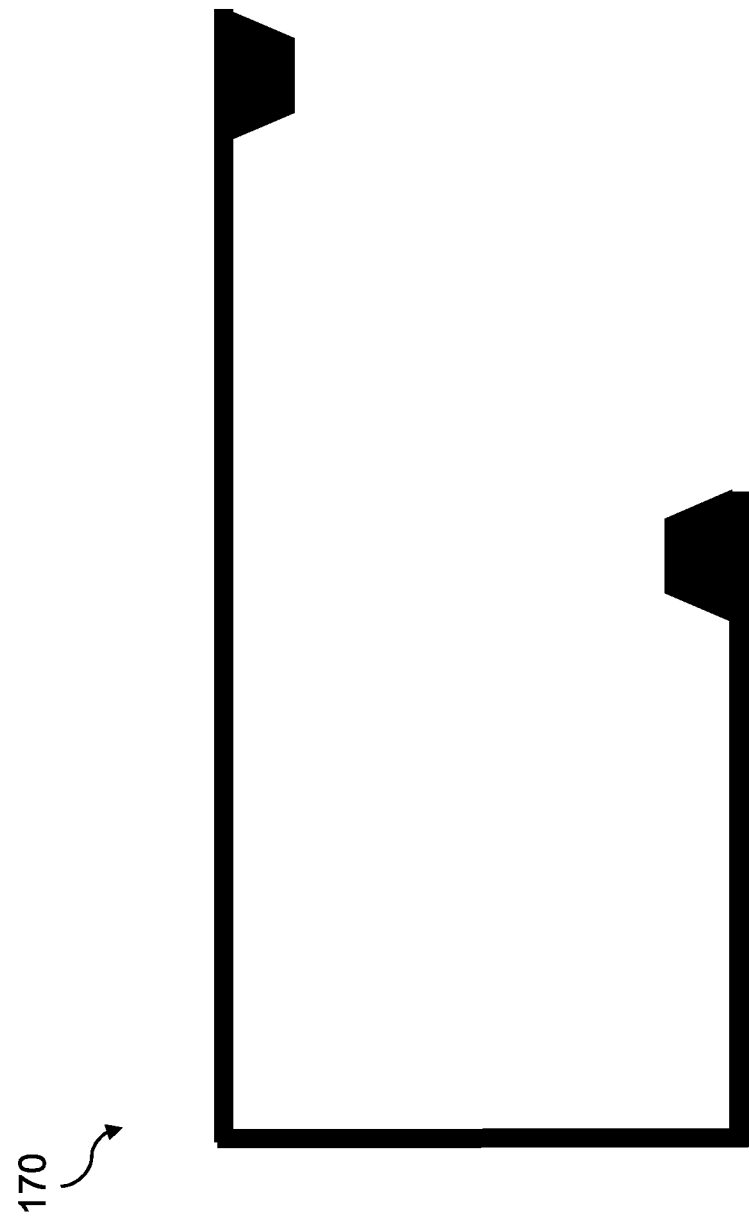
FIG. 14 illustrates an electrically-conductive elastic section 170.

FIG. 14 illustrates each electrically-conductive elastic section 170. The electrically-conductive elastic sections 170 are each formed of a metal, such as aluminum or copper, having a high electrical conductivity, in an elastically deformable shape. The electrically-conductive elastic sections 170 are each formed by an elongated rectangular metal plate being bent. Each electrically-conductive elastic section 170 has projections at both ends, in order to stably connect both ends of each electrically-conductive elastic section 170 to the metal plate 150 and the GND exposure portions 132 of the imaging sensor flexible cable 130. In FIG. 14, the shape of each projection is frustum. However, each projection may have, for example, a curved shape. When each projection has a curved shape, a contact resistance between the metal plate 150 and the GND exposure portions 132 of the imaging sensor flexible cable 130 can be reduced.

Figure 15:
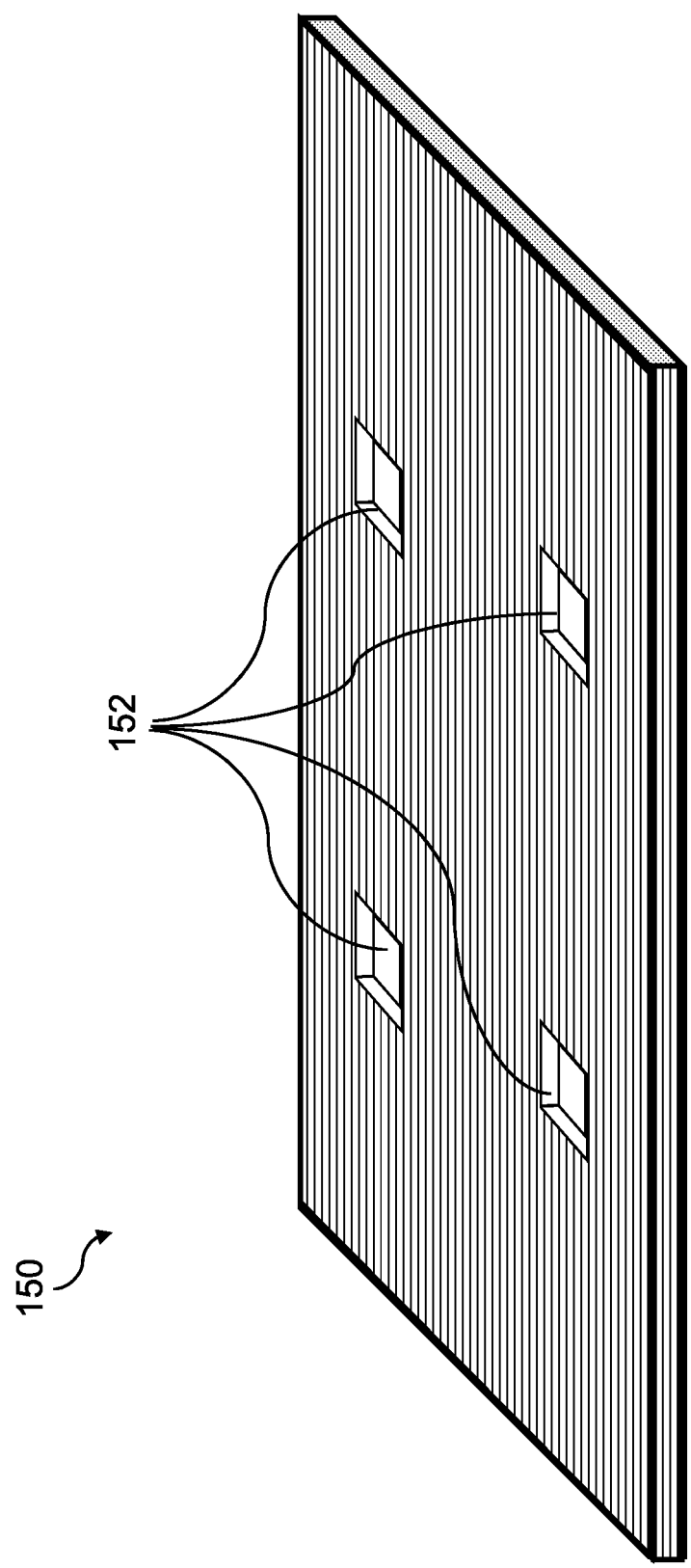
FIG. 15 is a perspective view of the metal plate 150.

FIG. 15 is a perspective view of the metal plate 150. As shown in FIG. 15, the metal plate 150 has the metal plate recesses 152. Each metal plate recess 152 is formed in a shape corresponding to the shape of the projection of the head portion of each electrically-conductive elastic section 170 as shown in FIG. 14. The shapes of the metal plate recesses 152 of the metal plate 150 and the projections of the head portions of the electrically-conductive elastic sections 170 are not limited to those shown in FIG. 14 and FIG. 15. The shapes of the metal plate recesses 152 and the projections of the head portions of the electrically-conductive elastic sections 170 may be different from those shown in FIG. 14 and FIG. 15, and may be any shapes that enable the metal plate recesses 152 of the metal plate 150 and the head portions of the electrically-conductive elastic sections 170 to be electrically connected in close contact with each other.

As described above, since the GND exposure portions 132 of the imaging sensor flexible cable 130 and the metal plate recesses 152 of the metal plate 150 are electrically connected to each other via the electrically-conductive elastic sections 170, a voltage induced at the imaging sensor 110 is reduced with the same effect as described for the first embodiment. As a result, needless to say, image interference in an image taken by the imaging device 200 can be reduced.

A configuration of the main circuit substrate 120 is the same as shown in FIG. 11A and FIG. 11B for the first embodiment, and description thereof is omitted.

As described above, in the imaging device 200 according to the second embodiment, the GND exposure portions 132 of the imaging sensor flexible cable 130 and the metal plate recesses 152 of the metal plate 150 are electrically connected to each other via the electrically-conductive elastic sections 170, thereby enabling a impedance of GND in the imaging sensor flexible cable 130 to be reduced. As a result, variation in GND potential in the imaging sensor flexible cable 130 can be restrained.

Further, the GND removal portion 180 of the main circuit substrate 120 and the metal plate 150 are electrically connected to each other via the electrically-conductive section 190, thereby enabling an impedance of GND in the metal plate 150 to be reduced. As a result, variation in GND potential in the imaging sensor 110 can be restrained.

Further, in the imaging device 200 according to the second embodiment, an electrically conductive filter for reducing an amount of light incident on the lenses is not used. Thus, also when the imaging device is used in an intense electric field environment, image interference caused by an external noise can be reduced without deteriorating an image quality of a captured image. Further, the internal structure is simplified, thereby downsizing the imaging device.

Further, in the imaging device 200 according to the second embodiment, the metal plate projections 151 shown in FIG. 7 are not provided on the front surface of the metal plate 150. Thus, GND of the imaging sensor flexible cable 130 and the metal plate 150 can be electrically connected to each other without applying a stress to the imaging sensor 110.

(Third Embodiment)

Figure 16:
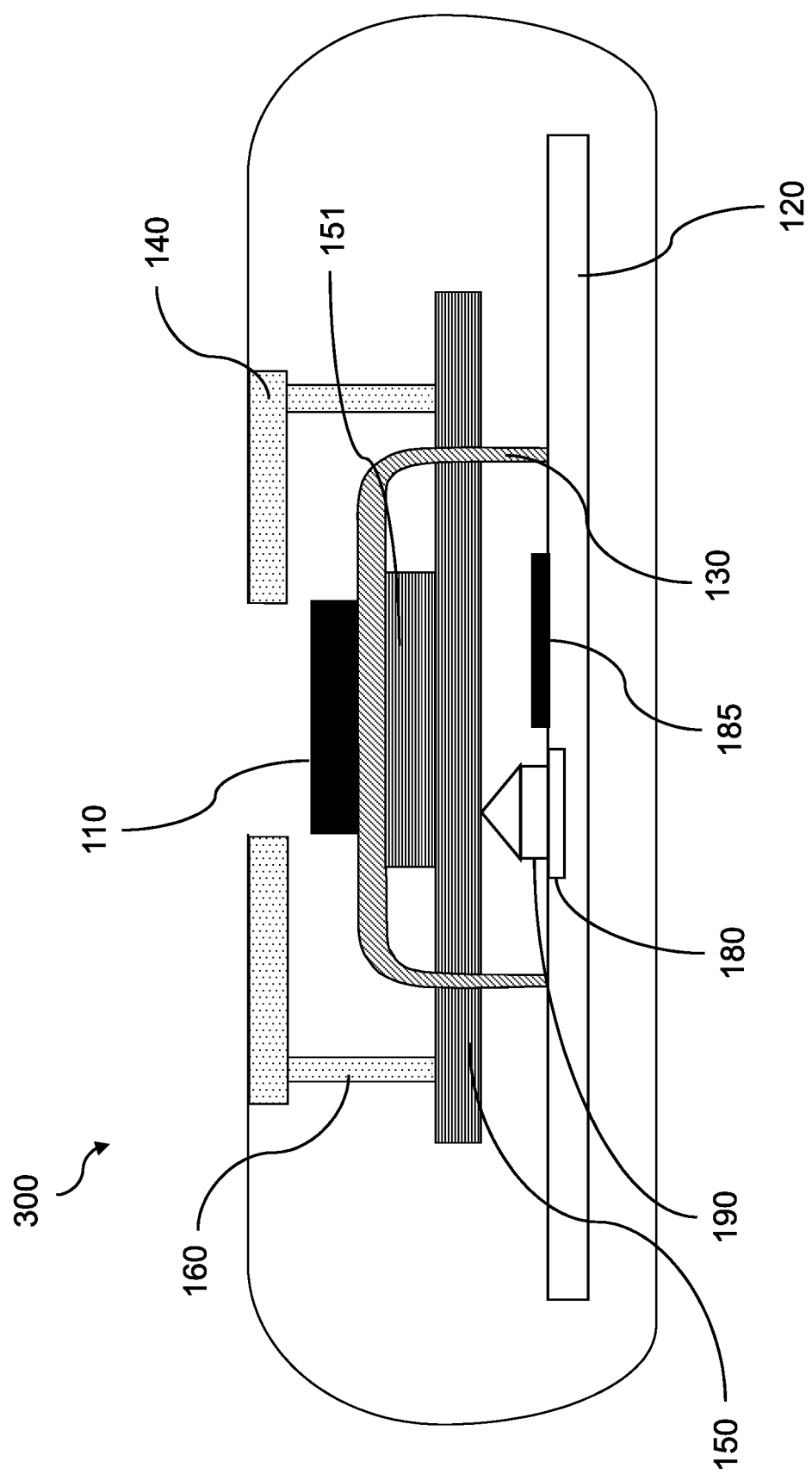
FIG. 16 is a cross-sectional view of an internal structure of an imaging device 300, as viewed from thereabove, according to a third embodiment of the present disclosure.

FIG. 16 is a cross-sectional view of an internal structure of an imaging device 300, as viewed from thereabove, according to a third embodiment of the present disclosure. For the present embodiment, difference from the first embodiment will be mainly described. A fundamental structure of the imaging device 300 is the same as that of the digital camera described with reference to FIG. 1 to FIG. 4.

As shown in FIG. 16, the imaging device 300 includes the imaging sensor 110, the main circuit substrate 120, the imaging sensor flexible cable 130, the mount 140, the metal plate 150, the connection sections 160, and the electrically-conductive section 190. The imaging sensor flexible cable 130 has the GND exposure portions 131. The metal plate 150 has the metal plate projections 151. The main circuit substrate 120 has the GND removal portion 180 and the AD conversion LSI 185 (an integrated circuit for AD conversion) on the front surface on the metal plate 150 side. In FIG. 16, the same components as those of the imaging device 100 according to the first embodiment as shown in FIG. 5 are denoted by the same reference numerals, and detailed description thereof is omitted. For the present embodiment, difference from the first embodiment will be mainly described.

The imaging device 300 according to the third embodiment is different from the imaging device 100 according to the first embodiment in that the AD conversion LSI 185 is mounted on a surface of the main circuit substrate 120 on the metal plate 150 side (namely, the same surface on which the GND removal portion 180 is formed) in the third embodiment. Further, the imaging device 300 is different from the imaging device 100 in that a portion of the electrically-conductive section 190 is disposed in an area where the imaging sensor 110 and the imaging sensor flexible cable 130 overlap each other, or in an area where the imaging sensor 110 and the main circuit substrate 120 overlap each other, in the imaging device 300. FIG. 17A is a perspective view of the main circuit substrate 120. In FIG. 17A, the main circuit substrate 120 has the GND removal portion 180 and the AD conversion LSI 185 on the same surface. The AD conversion LSI 185 is disposed, on the front surface of the main circuit substrate 120, in an area near the GND removal portion 180 to which the electrically-conductive section 190 is connected. FIG. 17B is a perspective view of the main circuit substrate 120 to which the electrically-conductive section 190 has been connected. As shown in FIG. 17B, the electrically-conductive section 190 is connected to the GND removal portion 180 on the main circuit substrate 120.

The electrically-conductive section 190 may be an electrically-conductive elastic section having an elastic function in addition to an electrical conductivity. The electrically-conductive elastic section is formed of a metal, such as aluminum or copper, having a high electrical conductivity, in an elastically deformable shape. When the electrically-conductive section 190 has the elastic function, generation of a stress applied to the imaging sensor 110 can be prevented, thereby preventing, for example, tilting of the imaging sensor 110.

As described above, in the imaging device 300 according to the third embodiment, the same effect as that in the first embodiment can be obtained.

Namely, in the imaging device 300 according to the third embodiment, also when the imaging device is used in an intense electric field environment, image interference caused by an external noise can be reduced without deteriorating an image quality of a captured image. Further, the internal structure is simplified, thereby downsizing the imaging device.

(Fourth Embodiment)

Figure 18:
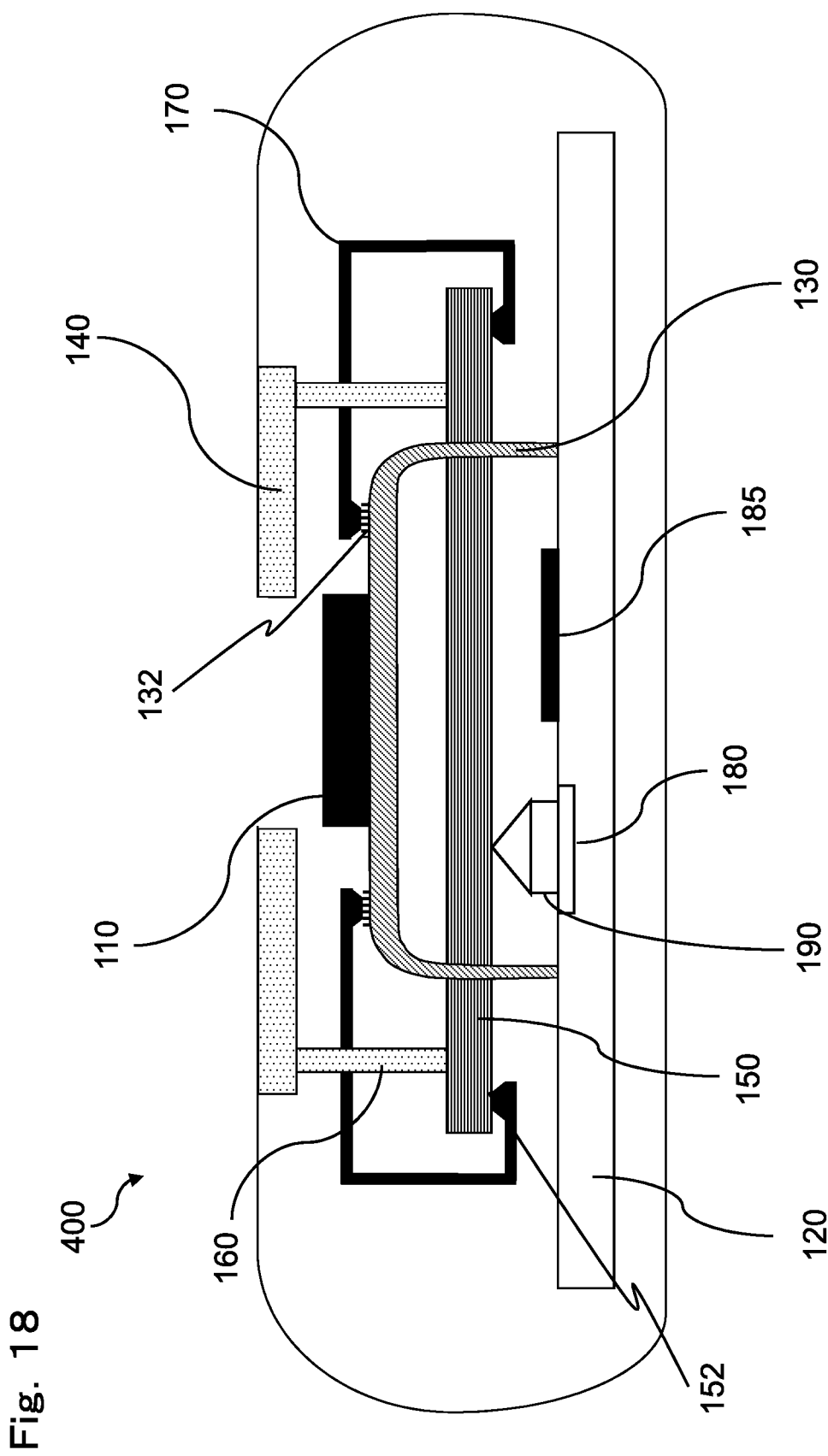
FIG. 18 is a cross-sectional view of an internal structure of an imaging device 400, as viewed from thereabove, according to a fourth embodiment of the present disclosure.

FIG. 18 is a cross-sectional view of an internal structure of an imaging device 400, as viewed from thereabove, according to a fourth embodiment of the present disclosure. For the present embodiment, difference from the second embodiment will be mainly described. A fundamental structure of the imaging device 400 is the same as that of the digital camera described with reference to FIG. 1 to FIG. 4.

As shown in FIG. 18, the imaging device 400 includes the imaging sensor 110, the main circuit substrate 120, the imaging sensor flexible cable 130, the mount 140, the metal plate 150, the connection sections 160, the electrically-conductive elastic sections 170, and the electrically-conductive section 190. The imaging sensor flexible cable 130 has the GND exposure portions 132. The metal plate recesses 152 are formed on the back surface of the metal plate 150. Further, the main circuit substrate 120 has the GND removal portion 180 and the AD conversion LSI 185 on the front surface on the metal plate 150 side. In FIG. 18, the same components as those of the imaging device 200 according to the second embodiment as shown in FIG. 12 are denoted by the same reference numerals, and detailed description thereof is omitted. For the present embodiment, difference from the second embodiment will be mainly described.

The imaging device 400 according to the fourth embodiment is different from the imaging device 200 according to the second embodiment in that the AD conversion LSI 185 is mounted on a surface of the main circuit substrate 120 on the metal plate 150 side (namely, the same surface on which the GND removal portion 180 is formed) in the fourth embodiment. Further, the imaging device 400 is different from the imaging device 200 in that a portion of the electrically-conductive section 190 is disposed in an area where the imaging sensor 110 and the imaging sensor flexible cable 130 overlap each other, or in an area where the imaging sensor 110 and the main circuit substrate 120 overlap each other, in the imaging device 400. The AD conversion LSI 185 is disposed, on the front surface of the main circuit substrate 120, in an area near the GND removal portion 180 to which the electrically-conductive section 190 is connected. A configuration of the main circuit substrate 120 is the same as shown in FIG. 17A and FIG. 17B for the third embodiment, and description thereof is omitted.

As described above, in the imaging device 400 according to the fourth embodiment, the same effect as that in the second embodiment can be obtained.

Namely, in the imaging device 400 according to the fourth embodiment, also when the imaging device is used in an intense electric field environment, image interference caused by an external noise can be reduced without deteriorating an image quality of a captured image. Further, the internal structure is simplified, thereby downsizing the imaging device.

(Fifth Embodiment)

Figure 19A:
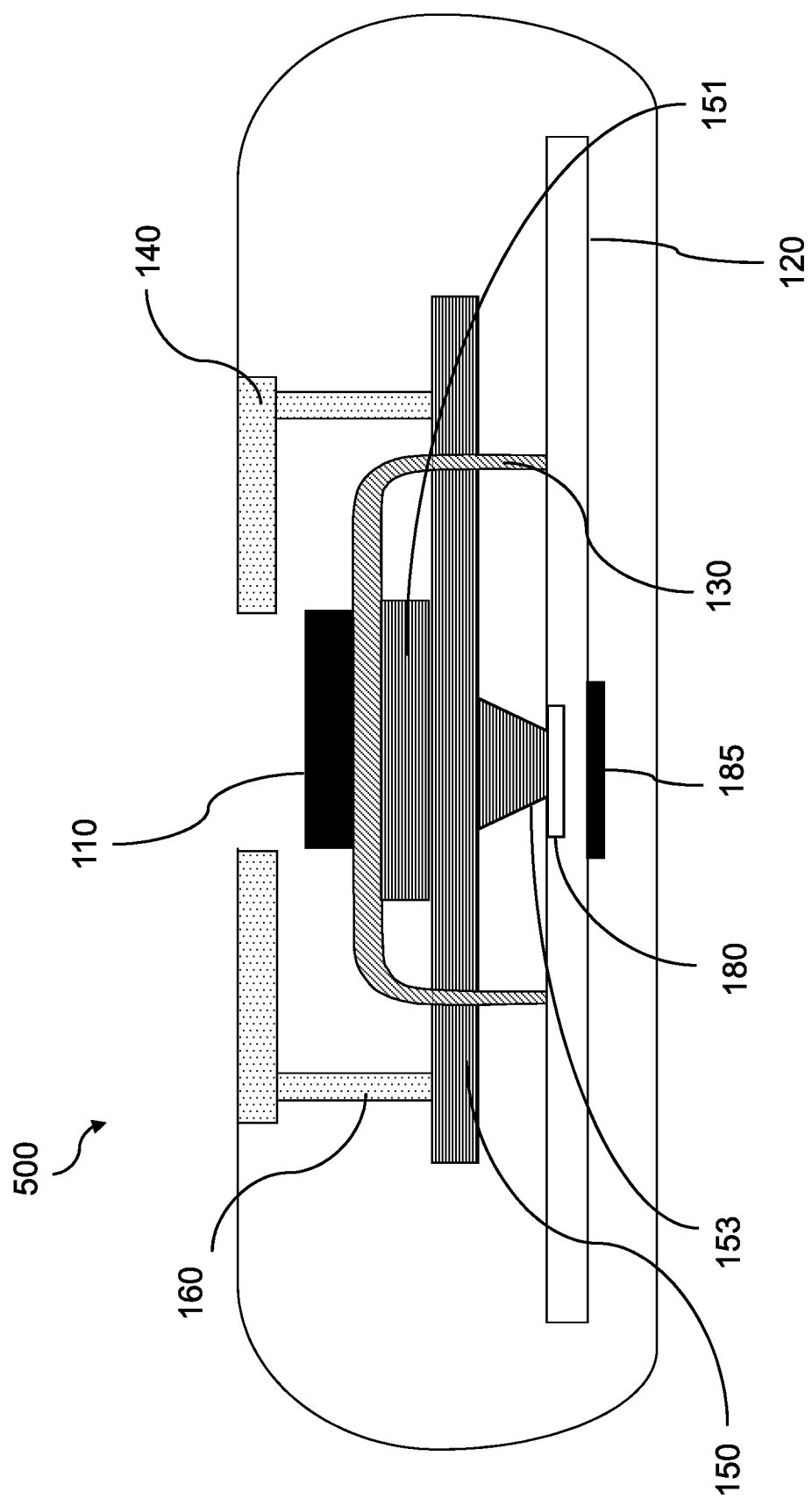
FIG. 19A is a cross-sectional view of an internal structure of an imaging device 500, as viewed from thereabove, according to a fifth embodiment of the present disclosure.

FIG. 19A is a cross-sectional view of an internal structure of an imaging device 500, as viewed from thereabove, according to a fifth embodiment of the present disclosure. For the present embodiment, difference from the first embodiment will be mainly described. A fundamental structure of the imaging device 500 is the same as that of the digital camera described with reference to FIG. 1 to FIG. 4.

As shown in FIG. 19A, the imaging device 500 includes the imaging sensor 110, the main circuit substrate 120, the imaging sensor flexible cable 130, the mount 140, the metal plate 150, and the connection sections 160. The imaging sensor flexible cable 130 has the GND exposure portions 131. The metal plate 150 has the metal plate projections 151 on the front surface on the imaging sensor 110 side. The metal plate 150 has a metal plate projection 153 on the back surface on the main circuit substrate 120 side. The main circuit substrate 120 has the GND removal portion 180 on the front surface on the metal plate 150 side. The main circuit substrate 120 has the AD conversion LSI 185 on the back surface on a side opposite to the metal plate 150 side. The AD conversion LSI 185 is disposed, on the back surface of the main circuit substrate 120, in an area opposite to the GND removal portion 180 to which the metal plate projection 153 is connected. In FIG. 19A, the same components as those of the imaging device 100 of the first embodiment as shown in FIG. 5 are denoted by the same reference numerals, and detailed description thereof is omitted. For the present embodiment, difference from the first embodiment will be mainly described.

The imaging device 500 according to the fifth embodiment is different from the imaging device 100 according to the first embodiment in that the metal plate 150 has the metal plate projection 153 in the fifth embodiment, instead of the electrically-conductive section 190 being provided as shown in FIG. 5. The metal plate projection 153 is structured so as to electrically connect between the metal plate 150 and the main circuit substrate 120, and corresponds to an electrically conductive section. The entirety of the metal plate projection 153 is disposed in an area where the imaging sensor 110 and the imaging sensor flexible cable 130 overlap each other, or in an area where the imaging sensor 110 and the main circuit substrate 120 overlap each other. Further, a shape of the metal plate projection 153 as viewed from the side thereof is not limited to a trapezoidal shape as shown in FIG. 19A. Namely, the shape of the metal plate projection 153 is not limited to a frustum having a rectangular bottom surface. A configuration of the main circuit substrate 120 is the same as shown in FIG. 11A for the first embodiment, and description thereof is omitted.

Figure 19B:
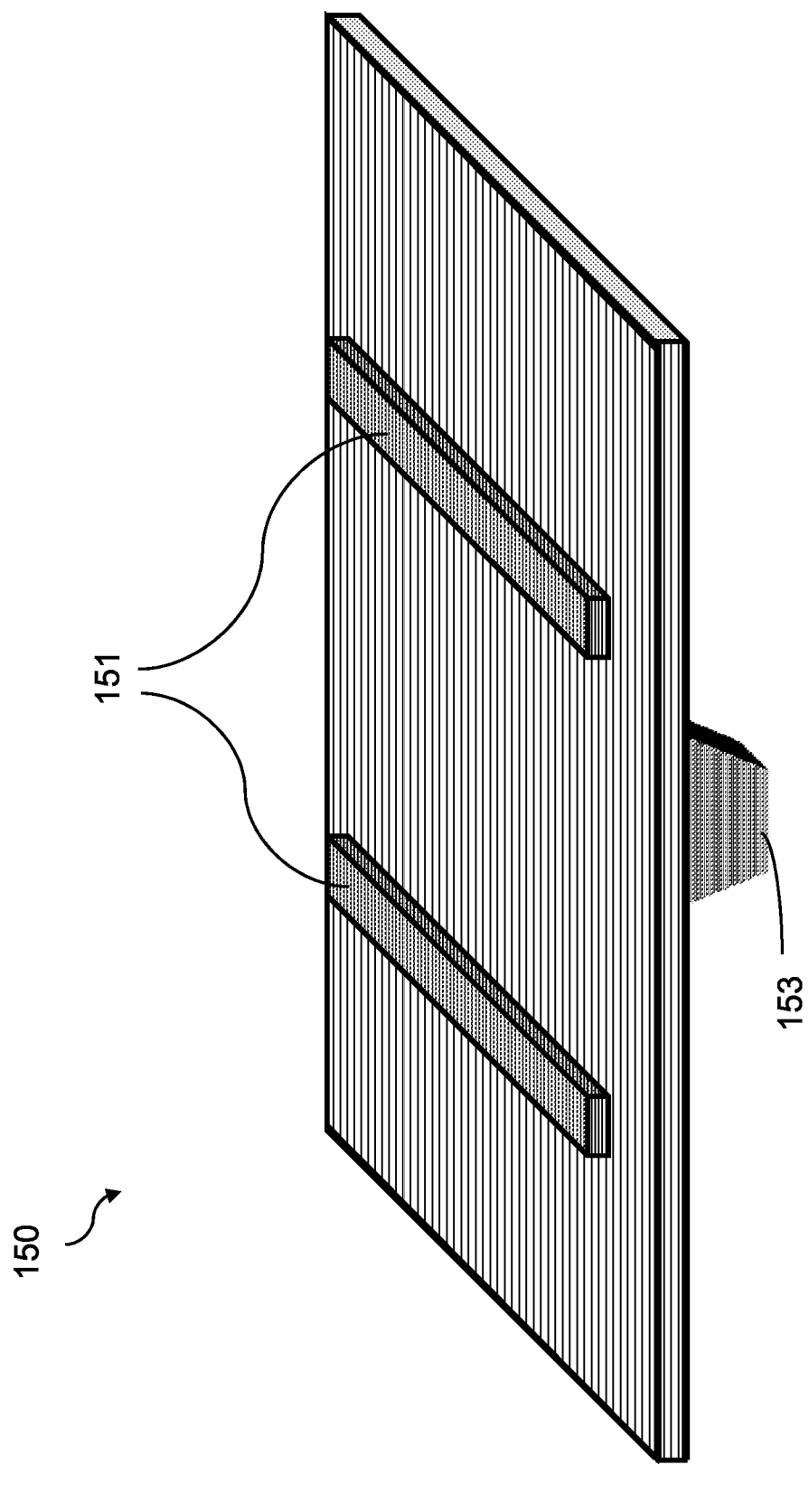
FIG. 19B is a perspective view of the metal plate 150.

FIG. 19B is a perspective view of the metal plate 150. As shown in FIG. 19B, the metal plate 150 has two metal plate projections 151 and the metal plate projection 153. The metal plate projections 151 are formed based on the shapes and positions of the GND exposure portions 131 of the imaging sensor flexible cable 130 shown in FIG. 6. The positions and shapes of the GND exposure portions 131 and the metal plate projections 151 are not limited to those shown in FIG. 6 and FIG. 7. The positions and shapes of the GND exposure portions 131 and the metal plate projections 151 may be different from those shown in FIG. 6 and FIG. 7, and may be any positions and shapes that enable the GND exposure portions 131 and the metal plate projections 151 to be electrically connected to each other.

Further, the metal plate projection 153 is formed based on the shape and position of the GND removal portion 180 of the main circuit substrate 120 as shown in FIG. 11A. The positions and shapes of the GND removal portion 180 and the metal plate projection 153 are not limited to those shown in FIG. 11A and FIG. 19A. The positions and shapes of the GND removal portion 180 and the metal plate projection 153 may be different from those shown in FIG. 11A and FIG. 19A, and may be any positions and shapes that enable the GND removal portion 180 and the metal plate projection 153 to be electrically connected to each other.

Further, as described above, the mount 140 and the metal plate 150 are fixed by means of the connection sections 160. Favorably, the connection sections 160 fix the mount 140 and the metal plate 150 such that the GND removal portion 180 and the metal plate projection 153 are in close contact with each other.

As described above, in the imaging device 500 according to the fifth embodiment, since the GND exposure portions 131 of the imaging sensor flexible cable 130 and the metal plate projections 151 of the metal plate 150 are electrically connected to each other, an impedance of GND in the imaging sensor flexible cable 130 can be reduced. As a result, variation in GND potential in the imaging sensor flexible cable 130 can be restrained.

Further, since the GND removal portion 180 of the main circuit substrate 120 and the metal plate projection 153 of the metal plate 150 are electrically connected to each other, an impedance of GND in the metal plate 150 can be reduced. As a result, variation in GND potential in the imaging sensor 110 can be restrained.

Namely, in the imaging device 500 according to the fifth embodiment, also when the imaging device is used in an intense electric field environment, image interference caused by an external noise can be reduced without deteriorating an image quality of a captured image. Further, the internal structure is simplified, thereby downsizing the imaging device.

(Sixth Embodiment)

FIG. 20A is a cross-sectional view of an internal structure of an imaging device 600, as viewed from thereabove, according to a sixth embodiment of the present disclosure. For the present embodiment, difference from the second embodiment will be mainly described. A fundamental structure of the imaging device 600 is the same as that of the digital camera described with reference to FIG. 1 to FIG. 4.

As shown in FIG. 20A, the imaging device 600 includes the imaging sensor 110, the main circuit substrate 120, the imaging sensor flexible cable 130, the mount 140, the metal plate 150, and the connection sections 160. The imaging sensor flexible cable 130 has the GND exposure portions 132. The metal plate 150 has the metal plate projection 153 on the back surface on the main circuit substrate 120 side. The main circuit substrate 120 has the GND removal portion 180 on the front surface on the metal plate 150 side. The main circuit substrate 120 has the AD conversion LSI 185 on the back surface on a side opposite to the metal plate 150 side. The AD conversion LSI 185 is disposed, on the back surface of the main circuit substrate 120, in an area opposite to the GND removal portion 180 to which the metal plate projection 153 is connected. In FIG. 20A, the same components as those of the imaging device 200 of the second embodiment as shown in FIG. 12 are denoted by the same reference numerals, and detailed description thereof is omitted. For the present embodiment, difference from the second embodiment will be mainly described.

The imaging device 600 according to the sixth embodiment is different from the imaging device 200 according to the second embodiment in that the metal plate 150 has the metal plate projection 153 in the sixth embodiment, instead of the electrically-conductive section 190 being provided as shown in FIG. 12. The metal plate projection 153 is structured so as to electrically connect between the metal plate 150 and the main circuit substrate 120, and corresponds to an electrically conductive section. A configuration of the main circuit substrate 120 is the same as shown in FIG. 11A for the first embodiment, and description thereof is omitted.

Figure 20B:
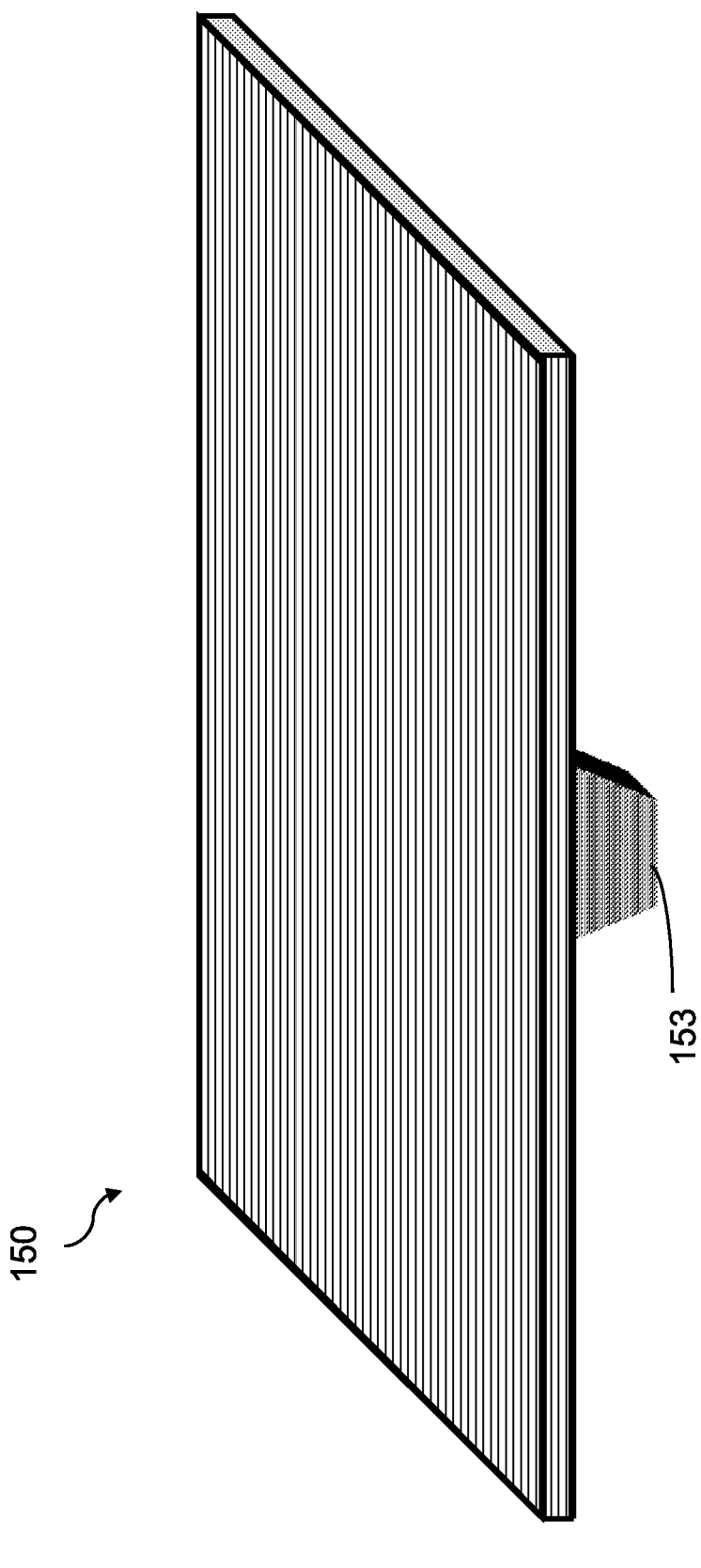
FIG. 20B is a perspective view of the metal plate 150.

FIG. 20B is a perspective view of the metal plate 150. As shown in FIG. 20B, the metal plate 150 has the metal plate projection 153. The entirety of the metal plate projection 153 is disposed in an area where the imaging sensor 110 and the imaging sensor flexible cable 130 overlap each other, or in an area where the imaging sensor 110 and the main circuit substrate 120 overlap each other. The metal plate projection 153 is formed based on the shape and position of the GND removal portion 180 of the main circuit substrate 120 as shown in FIG. 11A. The positions and shapes of the GND removal portion 180 and the metal plate projection 153 are not limited to those shown in FIG. 11A and FIG. 20A. The positions and shapes of the GND removal portion 180 and the metal plate projection 153 may be different from those shown in FIG. 11A and FIG. 20A, and may be any positions and shapes that enable the GND removal portion 180 and the metal plate projection 153 to be electrically connected to each other.

Further, as described above, favorably, the connection sections 160 fix the mount 140 and the metal plate 150 such that the GND removal portion 180 and the metal plate projection 153 are in close contact with each other.

As described above, in the imaging device 600 according to the sixth embodiment, since the GND exposure portions 132 of the imaging sensor flexible cable 130 and the metal plate recesses 152 of the metal plate 150 are electrically connected to each other via the electrically-conductive elastic sections 170, an impedance of GND in the imaging sensor flexible cable 130 can be reduced. As a result, variation in GND potential in the imaging sensor flexible cable 130 can be restrained.

Further, since the GND removal portion 180 of the main circuit substrate 120 and the metal plate projection 153 of the metal plate 150 are electrically connected to each other, an impedance of GND in the metal plate 150 can be reduced. As a result, variation in GND potential in the imaging sensor 110 can be restrained.

Namely, in the imaging device 600 according to the sixth embodiment, also when the imaging device is used in an intense electric field environment, image interference caused by an external noise can be reduced without deteriorating an image quality of a captured image. Further, the internal structure is simplified, thereby downsizing the imaging device.

(Seventh Embodiment)

Figure 21:
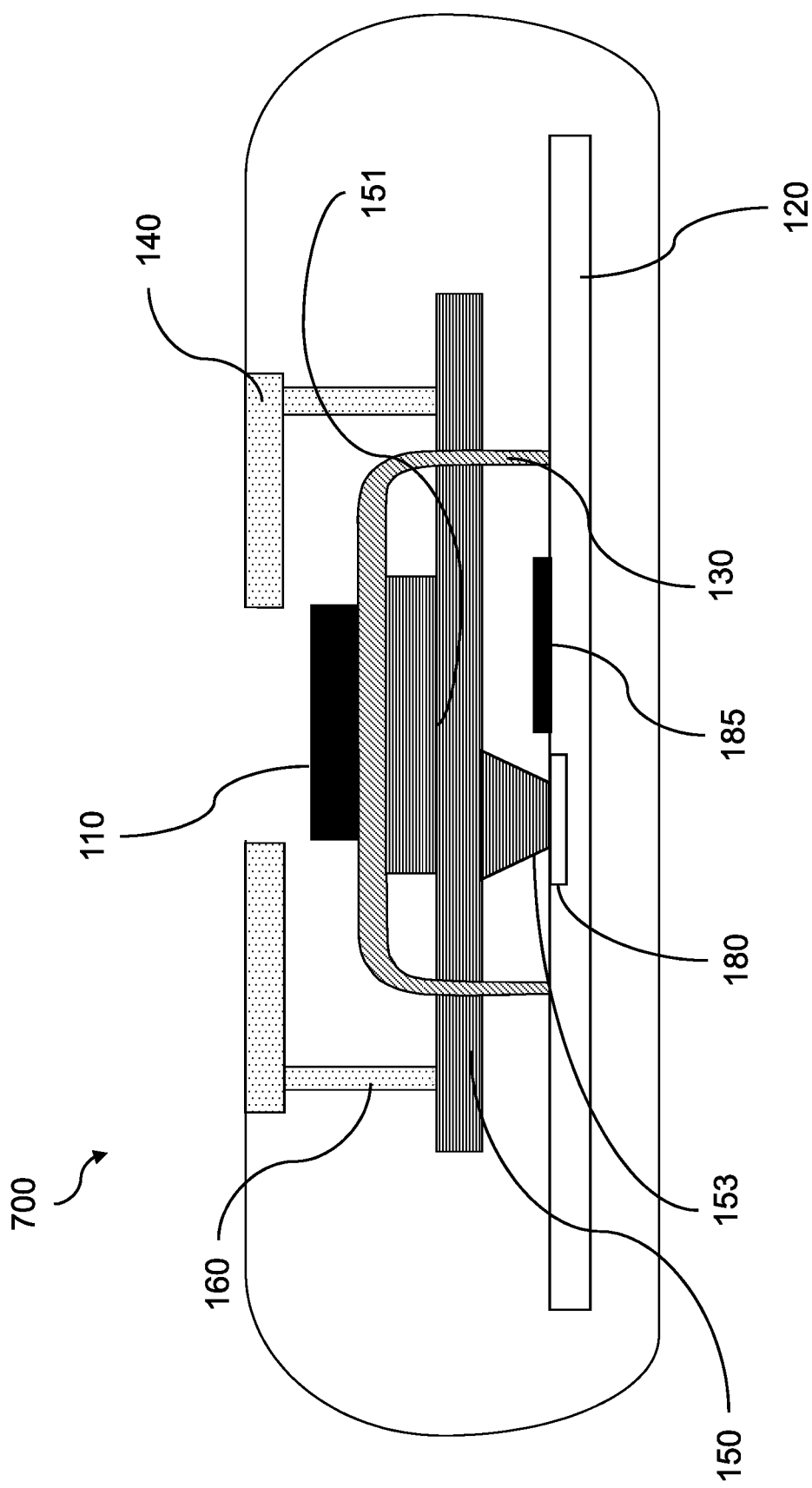
FIG. 21 is a cross-sectional view of an internal structure of an imaging device 700 as viewed from thereabove, according to a seventh embodiment of the present disclosure.

FIG. 21 is a cross-sectional view of an internal structure of an imaging device 700, as viewed from thereabove, according to a seventh embodiment of the present disclosure. For the present embodiment, difference from the fifth embodiment will be mainly described. A fundamental structure of the imaging device 700 is the same as that of the digital camera described with reference to FIG. 1 to FIG. 4.

As shown in FIG. 21, the imaging device 700 includes the imaging sensor 110, the main circuit substrate 120, the imaging sensor flexible cable 130, the mount 140, the metal plate 150, and the connection sections 160. The imaging sensor flexible cable 130 has the GND exposure portions 131. The metal plate 150 has the metal plate projections 151 on the front surface on the imaging sensor 110 side. The metal plate 150 has the metal plate projection 153 on the back surface on the main circuit substrate 120 side. The main circuit substrate 120 has the GND removal portion 180 having a GND potential, and the AD conversion LSI 185. In FIG. 21, the same components as those of the imaging device 500 of the fifth embodiment as shown in FIG. 19A are denoted by the same reference numerals, and detailed description thereof is omitted. For the present embodiment, difference from the fifth embodiment will be mainly described.

The imaging device 700 according to the seventh embodiment is different from the imaging device 500 according to the fifth embodiment in that the AD conversion LSI 185 is mounted on a surface of the main circuit substrate 120 on the metal plate 150 side (namely, the same surface on which the GND removal portion 180 is formed) in the seventh embodiment. Further, the imaging device 700 is different from the imaging device 500 in that a portion of the metal plate projection 153 is disposed in an area where the imaging sensor 110 and the imaging sensor flexible cable 130 overlap each other, or in an area where the imaging sensor 110 and the main circuit substrate 120 overlap each other, in the imaging device 700. The AD conversion LSI 185 is disposed, on the front surface of the main circuit substrate 120, in an area near the GND removal portion 180 to which the metal plate projection 153 is connected. A configuration of the main circuit substrate 120 is the same as shown in FIG. 17A, and a structure of the metal plate 150 is the same as shown in FIG. 19B.

As described above, in the imaging device 700 according to the seventh embodiment, the same effect as that in the fifth embodiment can be obtained.

Namely, in the imaging device 700 according to the seventh embodiment, also when the imaging device is used in an intense electric field environment, image interference caused by an external noise can be reduced without deteriorating an image quality of a captured image. Further, the internal structure is simplified, thereby downsizing the imaging device.

(Eighth Embodiment)

Figure 22:
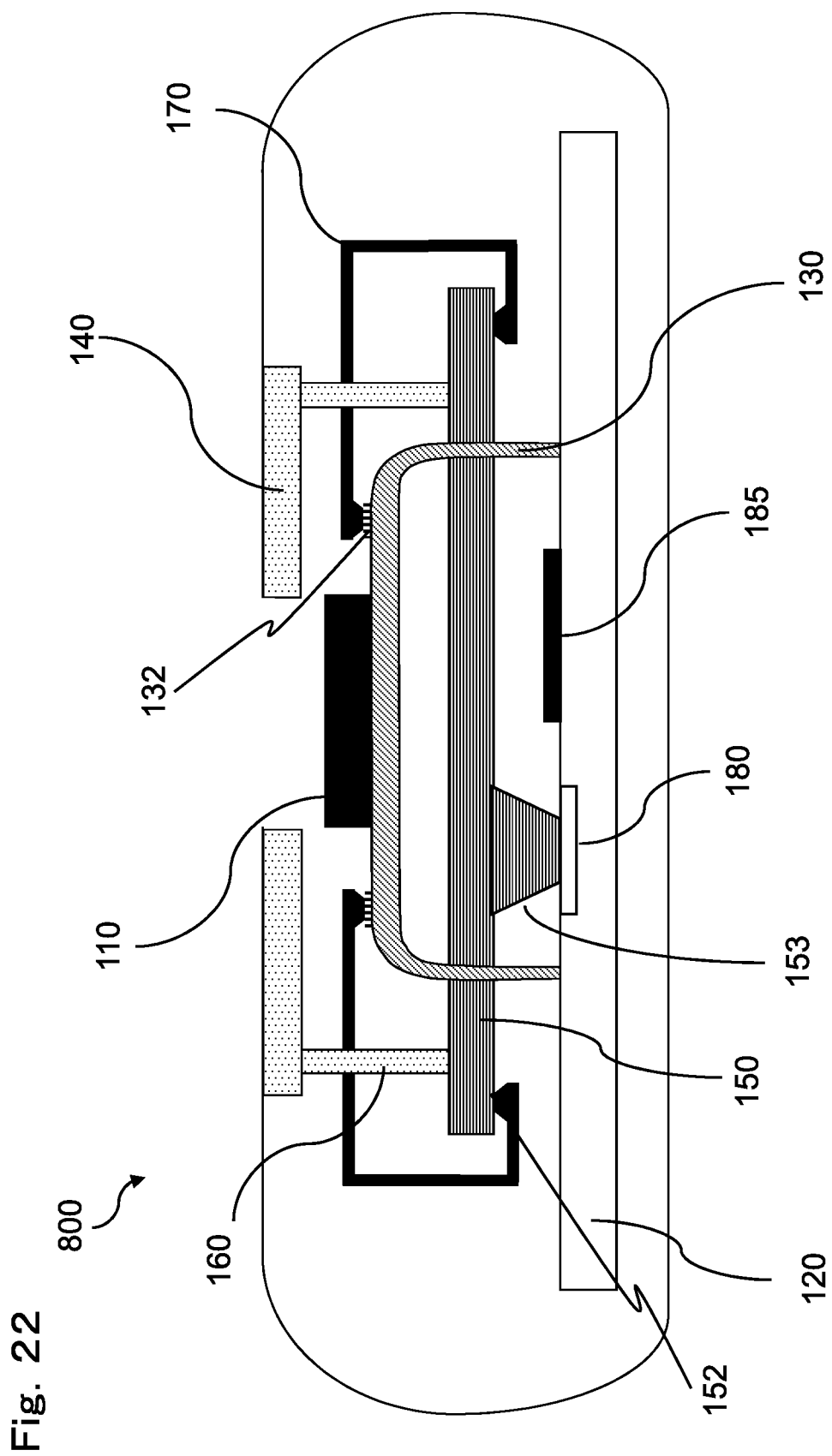
FIG. 22 is a cross-sectional view of an internal structure of an imaging device 800, as viewed from thereabove, according to an eighth embodiment of the present disclosure.

FIG. 22 is a cross-sectional view of an internal structure of an imaging device 800, as viewed from thereabove, according to an eighth embodiment of the present disclosure. For the present embodiment, difference from the sixth embodiment will be mainly described. A fundamental structure of the imaging device 800 is the same as that of the digital camera described with reference to FIG. 1 to FIG. 4.

As shown in FIG. 22, the imaging device 800 includes the imaging sensor 110, the main circuit substrate 120, the imaging sensor flexible cable 130, the mount 140, the metal plate 150, and the connection sections 160. The imaging sensor flexible cable 130 has the GND exposure portions 132. The metal plate 150 has the metal plate projection 153 on the back surface on the main circuit substrate 120 side. The main circuit substrate 120 has the GND removal portion 180 and the AD conversion LSI 185 on the front surface on the metal plate 150 side. In FIG. 22, the same components as those of the imaging device 600 of the sixth embodiment as shown in FIG. 20A are denoted by the same reference numerals, and detailed description thereof is omitted. For the present embodiment, difference from the sixth embodiment will be mainly described.

The imaging device 800 according to the eighth embodiment is different from the imaging device 600 according to the sixth embodiment in that the AD conversion LSI 185 is mounted on a surface of the main circuit substrate 120 on the metal plate 150 side (namely, the same surface on which the GND removal portion 180 is formed) in the eighth embodiment. Further, the imaging device 800 is different from the imaging device 600 in that a portion of the metal plate projection 153 is disposed in an area where the imaging sensor 110 and the imaging sensor flexible cable 130 overlap each other, or in an area where the imaging sensor 110 and the main circuit substrate 120 overlap each other, in the imaging device 800. The AD conversion LSI 185 is disposed, on the front surface of the main circuit substrate 120, in an area near the GND removal portion 180 to which the metal plate projection 153 is connected. A configuration of the main circuit substrate 120 is the same as shown in FIG. 17A, and a structure of the metal plate 150 is the same as shown in FIG. 20B.

As described above, in the imaging device 800 according to the eighth embodiment, the same effect as that in the sixth embodiment can be obtained.

Namely, in the imaging device 800 according to the eighth embodiment, also when the imaging device is used in an intense electric field environment, image interference caused by an external noise can be reduced without deteriorating an image quality of a captured image. Further, the internal structure is simplified, thereby downsizing the imaging device.

While the disclosure has been described in detail as above, the foregoing description is in all aspects illustrative and not restrictive. It will be understood that numerous other modifications and variations can be devised without departing from the scope of the disclosure.

What is claimed is:

1. An imaging device for taking an image of an object, the imaging device comprising:
an imaging sensor configured to capture an optical image of an object, and generate image data;
a main circuit substrate disposed behind the imaging sensor, the main circuit substrate including a first ground conductor having a ground potential, the main circuit substrate configured to perform signal processing of the image data generated by the imaging sensor;
an imaging sensor cable including a second ground conductor having a ground potential, wherein the imaging sensor cable has the imaging sensor mounted thereon, and is connected to the main circuit substrate;
a metal plate that is disposed between the main circuit substrate and an area of the imaging sensor cable where the imaging sensor is mounted thereon, and that is in electrical contact with the second ground conductor; and
a ground connection conductor that electrically connects between the first ground conductor and the metal plate, wherein
the ground connection conductor is disposed in an area where the imaging sensor and the imaging sensor cable overlap each other along the optical axis of the imagining device or in an area where the imaging sensor and the main circuit substrate overlap each other along the optical axis of the imagining device.

2. The imaging device of claim 1, wherein
the imaging sensor cable has the second ground conductor embedded therein, and
the metal plate is electrically connected to a ground exposure portion of the second ground conductor, and the ground exposure portion is exposed to an outside.

3. The imaging device of claim 2, wherein
the metal plate has a front-surface-side projection that projects toward the imaging sensor and is connected to the ground exposure portion.

4. The imaging device of claim 1, further comprising
a mount formed of a metal material and fixed to a main body casing of the imaging device, and
a connection section that electrically connects between the mount and the metal plate.

5. The imaging device of claim 2, further comprising an electrically-conductive elastic component formed so as to be elastically deformable, wherein
the metal plate and the ground exposure portion are connected to each other by the electrically-conductive elastic component.

6. The imaging device of claim 1, wherein
the ground connection conductor is formed so as to be elastically deformable.

7. The imaging device of claim 1, wherein
the ground connection conductor is a back-surface-side projection that projects from a surface of the metal plate on the main circuit substrate side.

8. The imaging device of claim 1, wherein
the main circuit substrate has the first ground conductor embedded therein, and
in the main circuit substrate,
an introduction portion is formed, as an opening or a cut portion, in a portion of an insulating layer that covers the first ground conductor, on a surface on the imaging sensor side, and
the ground connection conductor is connected to the first ground conductor via the introduction portion.

9. The imaging device of claim 8, wherein
in the main circuit substrate, an integrated circuit for AD conversion for performing digital conversion of the image data is disposed, in an area near the introduction portion, on the same surface as the surface on which the introduction portion is formed.

10. The imaging device of claim 8, wherein,
in the main circuit substrate, an integrated circuit for AD conversion for performing digital conversion of the image data is disposed, in an area opposite to an area of the introduction portion, on a surface reverse of the surface on which the introduction portion is formed.

11. The imaging device of claim 1, wherein
a portion of the ground connection conductor is disposed in the area where the imaging sensor and the imaging sensor cable overlap each other or in the area where the imaging sensor and the main circuit substrate overlap each other.

* * * * *